(12) United States Patent
Ryu et al.

(10) Patent No.: US 10,423,043 B2
(45) Date of Patent: Sep. 24, 2019

(54) LIQUID CRYSTAL DISPLAY

(71) Applicant: Samsung Display Co., Ltd., Yongin-si, Gyeonggi-do (KR)

(72) Inventors: Jang Wi Ryu, Seoul (KR); Cheol Shin, Hwaseong-si (KR); Hak Sun Chang, Yongin-si (KR); Ki Chul Shin, Seongnam-si (KR); Jae-Soo Jang, Suwon-si (KR); Ka Eun Kim, Seoul (KR); Ho Kil Oh, Yongin-si (KR); Se Hyun Lee, Seoul (KR); Hyo Ju Jung, Incheon (KR); Sang Hyeon Song, Seoul (KR); Sang Jin Jeon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/271,034

(22) Filed: Sep. 20, 2016

(65) Prior Publication Data

US 2017/0010487 A1 Jan. 12, 2017

Related U.S. Application Data

(63) Continuation of application No. 13/935,184, filed on Jul. 3, 2013, now Pat. No. 9,500,917.

(30) Foreign Application Priority Data

Mar. 15, 2013 (KR) .......................... 10-2013-0027892

(51) Int. Cl.
*G02F 1/1337* (2006.01)
*G02F 1/137* (2006.01)
(Continued)

(52) U.S. Cl.
CPC ............ *G02F 1/137* (2013.01); *G02F 1/1393* (2013.01); *G02F 1/13439* (2013.01);
(Continued)

(58) Field of Classification Search
CPC .. G02F 1/133707; G02F 1/1393; G02F 1/137; G02F 1/134309; G02F 1/13439;
(Continued)

(56) References Cited

U.S. PATENT DOCUMENTS 6,905,902 B2 6/2005 Shin et al.
7,714,966 B2 5/2010 Ishii
(Continued)

FOREIGN PATENT DOCUMENTS

CN 1721958 A 1/2006
CN 102375274 A 3/2012
(Continued)

OTHER PUBLICATIONS

European Search Report corresponding to EP 13177668.4, dated Feb. 21, 2014, 8 pages.

*Primary Examiner* — Nathanael R Briggs
*Assistant Examiner* — William Peterson
(74) *Attorney, Agent, or Firm* — Innovation Counsel LLP

(57) ABSTRACT

The present invention relates to a liquid crystal display including: a lower electrode including a unit pixel electrode; an upper electrode including an upper unit electrode facing the unit pixel electrode; and a liquid crystal layer between the lower electrode and the upper electrode and including a plurality of liquid crystal molecules aligned approximately perpendicular to the surfaces of the lower electrode and the upper electrode in the absence of an electric field, wherein the unit pixel electrode includes a stem forming a boundary between a plurality of sub-regions and a plurality of minute branches extending in different directions in two different sub-regions, the upper unit electrode includes an opening facing the stem and extending parallel to the stem, any (Continued)

alignment aid to pretilt the liquid crystal molecules is absent, and a length of the minute branches is equal to or less than about 53 μm.

10 Claims, 40 Drawing Sheets

(51) Int. Cl.
| | | |
|---|---|---|
| | *G02F 1/1343* | (2006.01) |
| | *G02F 1/139* | (2006.01) |
| | G02F 1/1368 | (2006.01) |
| | G02F 1/1362 | (2006.01) |
| | G02F 1/1335 | (2006.01) |
| | G02F 1/1333 | (2006.01) |

(52) U.S. Cl.
CPC .. *G02F 1/133707* (2013.01); *G02F 1/134309* (2013.01); *G02F 1/1368* (2013.01); *G02F 1/133345* (2013.01); *G02F 1/133512* (2013.01); *G02F 1/133514* (2013.01); *G02F 1/136286* (2013.01); *G02F 2001/13712* (2013.01); *G02F 2001/134318* (2013.01); *G02F 2001/134345* (2013.01); *G02F 2001/134381* (2013.01); *G02F 2201/123* (2013.01); *G02F 2203/01* (2013.01); *G02F 2203/04* (2013.01)

(58) Field of Classification Search
CPC ......... G02F 1/133345; G02F 1/133512; G02F 1/133514; G02F 1/136286; G02F 1/1368; G02F 2001/134318; G02F 2001/13712; G02F 2001/134381; G02F 2001/134345; G02F 2201/123; G02F 2203/01; G02F 2203/04
USPC ....................................................... 349/129
See application file for complete search history.

(56) References Cited

U.S. PATENT DOCUMENTS

| | | | |
|---|---|---|---|
| 8,054,426 B2 | 11/2011 | Choi et al. | |
| 8,149,363 B2 | 4/2012 | Hashimoto et al. | |
| 8,269,935 B2 | 9/2012 | Kuo et al. | |
| 8,330,921 B2* | 12/2012 | Tsao | G02F 1/133707 349/141 |
| 2004/0080695 A1 | 4/2004 | Choi et al. | |
| 2004/0233360 A1 | 11/2004 | Yoshida et al. | |
| 2007/0070273 A1* | 3/2007 | Yoshida | G02F 1/133555 349/114 |
| 2009/0002588 A1 | 1/2009 | Lee et al. | |
| 2009/0040407 A1 | 2/2009 | Kim | |
| 2009/0256985 A1 | 10/2009 | Jung et al. | |
| 2010/0007833 A1 | 1/2010 | Kuo et al. | |
| 2010/0060838 A1 | 3/2010 | Kim et al. | |
| 2011/0001691 A1 | 1/2011 | Hashimoto et al. | |
| 2011/0037932 A1 | 2/2011 | Takahashi | |
| 2011/0149223 A1 | 6/2011 | Tsao et al. | |
| 2012/0050237 A1 | 3/2012 | Noguchi et al. | |
| 2012/0281173 A1 | 11/2012 | Kwon et al. | |

FOREIGN PATENT DOCUMENTS

| | | |
|---|---|---|
| JP | 11-352490 | 12/1999 |
| JP | 2005-309239 | 11/2005 |
| JP | 2012-047802 | 3/2012 |
| KR | 10-0289535 | 2/2001 |
| KR | 10-2008-0003998 A | 1/2008 |
| KR | 10-2008-0023835 | 3/2008 |
| KR | 10-0813349 | 3/2008 |
| KR | 10-2009-0015243 A | 2/2009 |
| KR | 10-2001-0063302 | 7/2011 |
| KR | 10-2012-0019368 A | 3/2012 |
| KR | 10-2014-0078358 | 6/2014 |
| WO | 2009-093432 | 7/2009 |

* cited by examiner

LIQUID CRYSTAL DISPLAY

CROSS-REFERENCE TO RELATED APPLICATION

This application is a continuation application of U.S. patent application Ser. No. 13/935,184 filed on Jul. 3, 2013, which claims priority to and the benefit of Korean Patent Application No. 10-2013-0027892 filed in the Korean Intellectual Property Office on Mar. 15, 2013, the entire contents of which are incorporated herein by reference.

BACKGROUND (a) Technical Field

Embodiments of the present invention relate to a liquid crystal display. More particularly, the present invention relates to a vertical alignment (VA) mode liquid crystal display with an increased transmittance.

(b) Description of the Related Art

A liquid crystal display (LCD) is one of the most widely used flat panel displays (FPD), and it is composed of two display panels on which field generating electrodes such as pixel electrodes and a common electrode are formed, and a liquid crystal layer interposed between the two display panels. A voltage is applied to the field generating electrodes to generate an electric field on the liquid crystal layer, and the orientation of liquid crystal molecules of the liquid crystal layer is determined and the polarization of incident light is controlled through the generated electric field to display an image.

Among the LCDs, a vertical alignment (VA) mode LCD, which aligns LC molecules such that their long axes are perpendicular to the panels in the absence of an electric field, is spotlighted because of its high contrast ratio and wide reference viewing angle.

In the vertical alignment (VA) mode liquid crystal display, to obtain the wide viewing angle, a plurality of domains in which the alignment direction of the liquid crystal molecules are different may be formed in one pixel.

As one example of forming the plurality of domains in one pixel, there is a method of forming cutouts of minute slits in the field generating electrodes. In this method, the plurality of domains may be formed by aligning the liquid crystal molecules vertically with respect to a fringe field generated between edges of the cutouts and the field generating electrodes facing the edges.

As examples, liquid crystal displays having a domain-forming member include a VA mode liquid crystal display having domain-forming members formed at both of the upper and lower substrates, and a patternless VA mode liquid crystal display having minute patterns formed only at a lower substrate without forming patterns on an upper substrate. A display area is sectored into a plurality of domains by the domain-forming members, and liquid crystal molecules in each domain are inclined in the same direction.

Recently, a method for providing a pretilt to the liquid crystal molecules in the absence of an electric field has been developed to improve the response speed of the liquid crystal while realizing a wide viewing angle. For the liquid crystal molecules to have the pretilt of the various directions, alignment layers having various alignment directions may be used, or an alignment aid is added and is hardened to pretilt the liquid crystal molecules of the liquid crystal layer after applying the electric field to the liquid crystal layer. The alignment aid hardened by heat or light such as ultraviolet rays may provide the pretilt to the liquid crystal molecules in a predetermined direction. To generate the electric field to the liquid crystal layer, the voltage is respectively applied to the field generating electrodes.

However, to manufacturing the liquid crystal display including the alignment aid for the pretilt, the precursor of the alignment aid is added to a liquid crystal layer or an alignment layer, and the hardening process of ultraviolet rays must be added such that a new process line is required and an increase in cost is inevitable. Accordingly, the manufacturing cost of the liquid crystal display is increased, the additional manufacturing equipment is required, and the manufacturing process is complicated.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal display manufactured with a low manufacturing cost and a simple manufacturing process without additional manufacturing equipment and that increases a liquid crystal control force and a transmittance.

The present invention improves a display defect such as spots due to an external pressure.

A liquid crystal display according to an exemplary embodiment of the present invention includes: a lower electrode including at least one unit pixel electrode; an upper electrode including at least one upper unit electrode facing at least one unit pixel electrode; and a liquid crystal layer positioned between the lower electrode and the upper electrode and including a plurality of liquid crystal molecules aligned approximately perpendicular to the surfaces of the lower electrode and the upper electrode in the absence of an electric field, wherein the unit pixel electrode includes a stem forming a boundary between a plurality of sub-regions and a plurality of minute branches extending in different directions in two different sub-regions, the upper unit electrode includes an opening facing the stem and extending parallel to the stem, any alignment aid to pretilt the liquid crystal molecules is absent, and a length of the minute branches is equal to or less than about 53 μm.

The stem may include a cross-shaped stem, and the unit pixel electrode may include a center pattern positioned at the center of the cross-shaped stem.

The center pattern may include a polygon including a plurality of straight edges respectively positioned at the plurality of sub-regions and a vertex positioned on the stem.

The opening may include a cross-shaped opening, and the upper unit electrode may include a center opening positioned at the center of the cross-shaped opening.

The center opening may include a polygon including a plurality of straight edges respectively positioned at the plurality of sub-regions.

The center opening may be smaller than the center pattern.

When the lower electrode includes a plurality of unit pixel electrodes and the upper electrode includes a plurality of upper unit electrodes, the plurality of unit pixel electrodes may be connected to each other through a first connection positioned on an extending line of the stem, and the plurality of upper unit electrodes may be connected to each other through a second connection positioned on an extending line of the opening.

A width of the stem may be smaller than a width of the opening.

One pixel may include a first sub-pixel and a second sub-pixel displaying images having luminances that are equal to each other or different from each other for one input image signal, the first sub-pixel and the second sub-pixel may respectively include the lower electrode and the upper electrode, and a number of the at least one unit pixel electrode included in the second sub-pixel may be larger than a number of the at least one unit pixel electrode included in the first sub-pixel.

A width of a transverse gap extending in a horizontal direction and between the unit pixel electrodes of the first sub-pixel may be smaller than a width of a longitudinal gap extending in a vertical direction and between the unit pixel electrodes of the first sub-pixel, and a width of a transverse gap extending in the horizontal direction and between the unit pixel electrodes of the second sub-pixel may be larger than a width of a longitudinal gap extending in the vertical direction and between the unit pixel electrodes of the second sub-pixel.

A width of a transverse opening extending in the horizontal direction of the opening of the upper unit electrode included in the first sub-pixel may be smaller than a width of a longitudinal opening extending in the vertical direction of the opening of the upper unit electrode included in the first sub-pixel, and a width of a transverse opening extending in the horizontal direction of the opening of the upper unit electrode included in the second sub-pixel may be larger than a width of a longitudinal opening extending in the vertical direction of the opening of the upper unit electrode included in the second sub-pixel.

A first connection connecting ends of the minute branches positioned respectively at an upper end and a lower end of the lower electrode of the first sub-pixel, and a second connection connecting ends of the minute branches positioned respectively at a left end and a right end of the lower electrode of the second sub-pixel, may be further included.

An angle between the minute branches included in the lower electrode of the first sub-pixel and the horizontal direction may be smaller than substantially 45 degrees.

A liquid crystal display according to an exemplary embodiment of the present invention includes: a lower electrode including at least one unit pixel electrode; an upper electrode including at least one upper unit electrode facing at least one unit pixel electrode; and a liquid crystal layer positioned between the lower electrode and the upper electrode, wherein the unit pixel electrode includes a stem forming a boundary between a plurality of sub-regions and a plurality of minute branches extending in different directions in different sub-regions, and the unit pixel electrode includes a center pattern positioned at a center of the stem and including a plurality of straight edges respectively positioned at the plurality of sub-regions.

A length of the minute branches may be equal to or less than about 53 μm.

Any alignment aid to pretilt the liquid crystal molecules may be absent.

The stem may include a cross stem.

The upper unit electrode may include an opening facing the stem and extending in parallel to the stem.

At least one among a plurality of corners included in the unit pixel electrode may be chamfered.

The lower electrode may include a plurality of unit pixel electrodes, and a width of the gap between neighboring unit pixel electrodes may not be uniform according to a position in the lower electrode.

The width of the gap may be increased as the gap is closer to the corner of the unit pixel electrode.

A connection connecting at least portions among ends of the minute branches adjacent to the gap may be further included.

A liquid crystal display according to an exemplary embodiment of the present invention includes: a lower electrode including at least one unit pixel electrode; an upper electrode including at least one upper unit electrode facing at least one unit pixel electrode; and a liquid crystal layer positioned between the lower electrode and the upper electrode, wherein the unit pixel electrode includes a stem forming a boundary between a plurality of sub-regions and a plurality of minute branches extending in different directions in different sub-regions, and at least one among a plurality of corners included in the unit pixel electrode is chamfered.

A liquid crystal display according to an exemplary embodiment of the present invention includes: a lower electrode including at least one unit pixel electrode; an upper electrode including at least one upper unit electrode facing at least one unit pixel electrode; and a liquid crystal layer positioned between the lower electrode and the upper electrode, wherein the unit pixel electrode includes a stem forming a boundary between a plurality of sub-regions and a plurality of minute branches extending in different directions in different sub-regions, and a width of a gap between neighboring unit pixel electrodes is not uniform according to a position in the lower electrode.

According to an exemplary embodiment of the present invention, the liquid crystal display manufactured with a low manufacturing cost and a simple manufacturing process without additional manufacturing equipment and that increases the liquid crystal control force and the transmittance is provided.

Also, the display defect such as a bruising according to external pressure may be reduced.

DETAILED DESCRIPTION OF THE EMBODIMENTS

Figure 1:
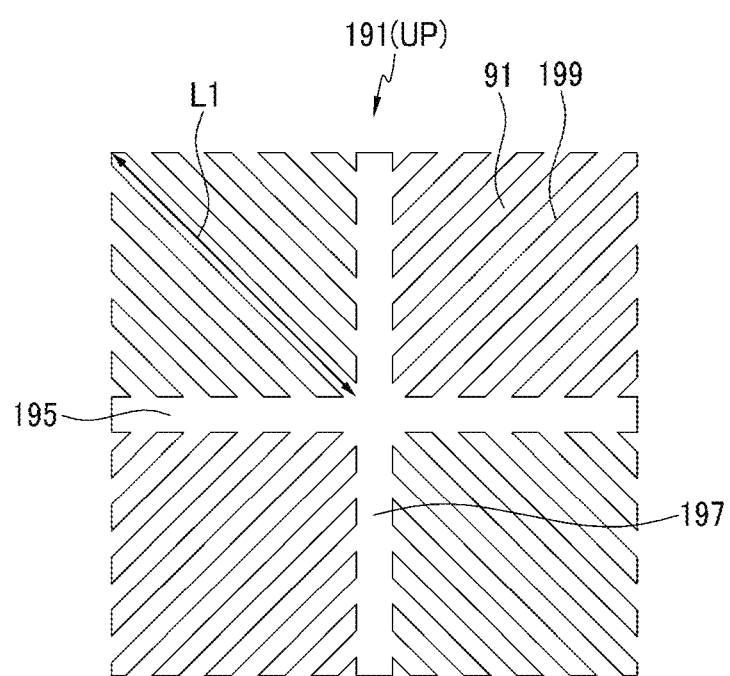
FIG. 1 is a top plan view of a lower electrode of a liquid crystal display according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to an exemplary embodiment of the present invention will be described with reference to FIG. 1 to FIG. 5.

Figure 2:
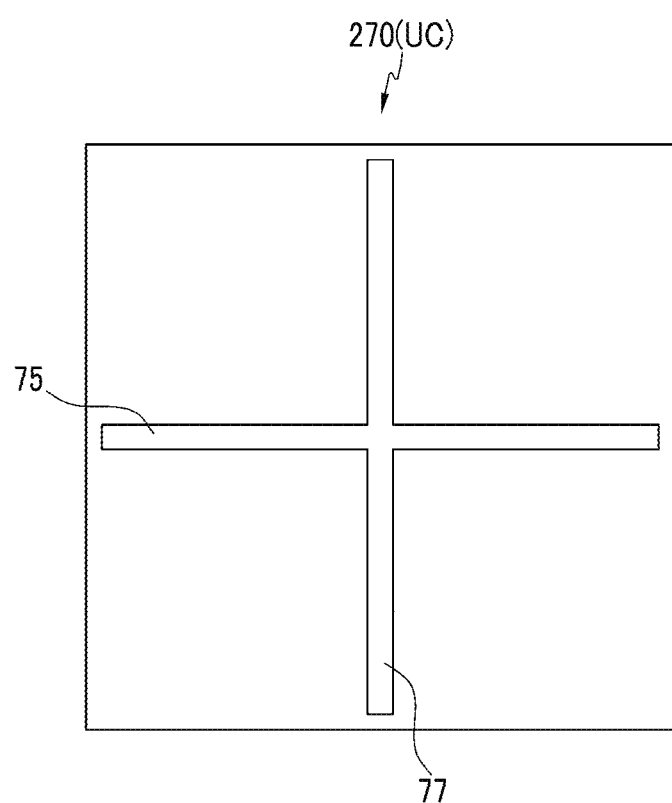
FIG. 2 is a top plan view of an upper electrode of a liquid crystal display according to an exemplary embodiment of the present invention.
Figure 3:
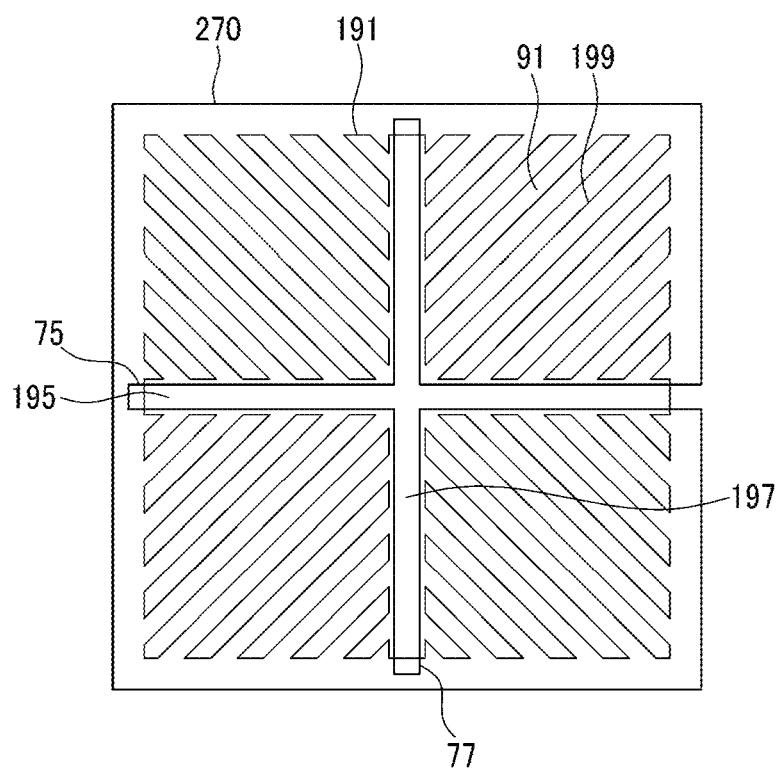
FIG. 3 is a top plan view showing the lower electrode of FIG. 1 and the upper electrode of FIG. 2 together.
Figure 4:
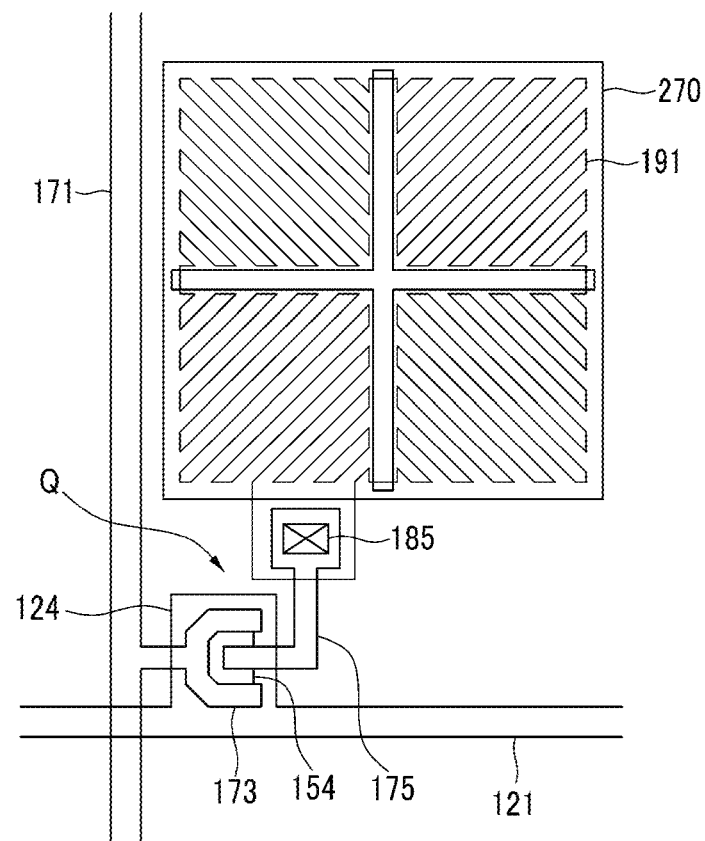
FIG. 4 is a layout view of one pixel of a liquid crystal display according to an exemplary embodiment of the present invention.
Figure 5:
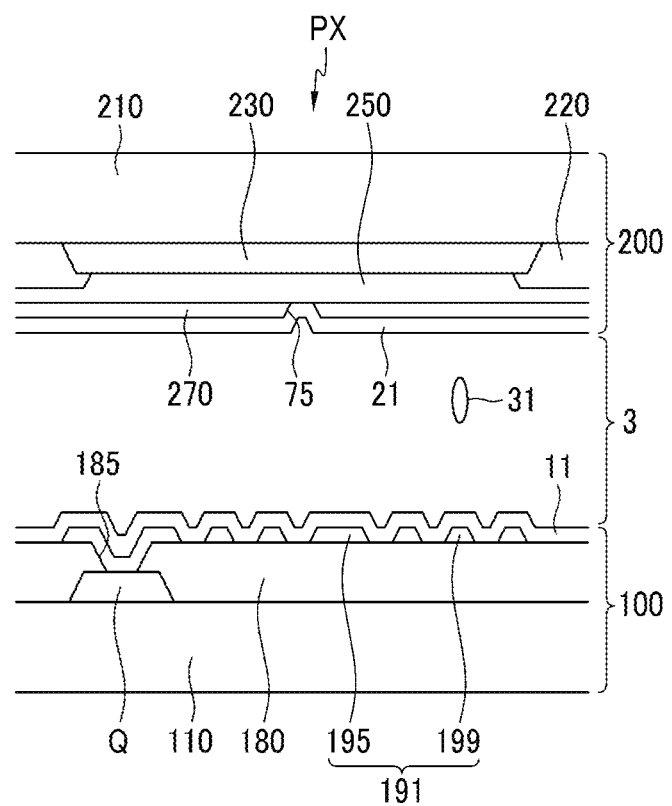
FIG. 5 is a cross-sectional view of the liquid crystal display of FIG. 4, FIG. 6A and FIG. 6B are views of a fringe field formed by a lower electrode and an upper electrode of a liquid crystal display according to an exemplary embodiment of the present invention.

FIG. 1 is a top plan view of a lower electrode of a liquid crystal display according to an exemplary embodiment of the present invention, FIG. 2 is a top plan view of an upper electrode of a liquid crystal display according to an exemplary embodiment of the present invention, FIG. 3 is a top plan view showing the lower electrode of FIG. 1 and the upper electrode of FIG. 2 together, FIG. 4 is a layout view of one pixel of a liquid crystal display according to an exemplary embodiment of the present invention, and FIG. 5 is a cross-sectional view of the liquid crystal display of FIG. 4.

Referring to FIG. 4 and FIG. 5, a liquid crystal display according to an exemplary embodiment of the present invention includes a lower panel 100 and an upper panel 200 facing each other, and a liquid crystal layer 3 interposed between the two display panels 100 and 200.

Referring to the lower panel 100, a gate line 121 including a gate electrode 124 is formed on an insulating substrate 110. The gate lines 121 transmit gate signals and extend in the transverse direction.

A gate insulating layer (not shown) is formed on the gate line 121, and a semiconductor 154 made of hydrogenated amorphous silicon, polysilicon, or an oxide semiconductor is positioned on the gate insulating layer.

A data line 171 and a drain electrode 175 are formed on the semiconductor 154 and the gate insulating layer.

The data line 171 transmits data voltages and extends in the longitudinal direction thereby intersecting the gate line 121. The data line 171 includes a source electrode 173 extending toward the gate electrode 124.

The drain electrode 175 is separated from the data line 171 and includes a portion facing the source electrode 173.

The gate electrode 124, the source electrode 173, and the drain electrode 175 form a thin film transistor (TFT) Q along with the semiconductor 154.

A passivation layer 180 is positioned on the thin film transistor Q. The passivation layer 180 has a contact hole 185 exposing the drain electrode 175.

A lower electrode 191 is formed on the passivation layer 180. The lower electrode 191 may be made of a transparent conductive material such as indium tin oxide (ITO) or indium zinc oxide (IZO), or a reflective metal such as aluminum, silver, chromium, or an alloy thereof. The lower electrode 191 may receive the data voltage through the thin film transistor Q controlled by the gate signal.

Referring to FIG. 1, the lower electrode 191 may include at least one unit pixel electrode UP, and FIG. 1 shows an example that the lower electrode 191 includes a unit pixel electrode UP. The entire shape of the unit pixel electrode UP positioned at one pixel PX is a quadrangle, and includes a cross-shaped stem made of a transverse stem 195 and a longitudinal stem 197 intersecting the transverse stem 195. The unit pixel electrode UP is divided into four sub-regions by the transverse stem 195 and the longitudinal stem 197, and includes a plurality of minute branches 199 formed in each sub-region. A minute slit 91 in which the electrode is removed is positioned between the adjacent minute branches 199.

The transverse stem 195 of the unit pixel electrode UP may approximately extend in parallel to the gate line 121, and the longitudinal stem 197 of the unit pixel electrode UP may approximately extend in parallel to the data line 171.

Among the four sub-regions of the unit pixel electrode UP, the minute branches 199 of the sub-region positioned at the upper left obliquely extend from the transverse stem 195 or the longitudinal stem 197 in the left upper direction, the minute branches 199 of the sub-region positioned at the upper right obliquely extend from the transverse stem 195 or the longitudinal stem 197 in the right upper direction, the minute branches 199 of the sub-region positioned at the lower left obliquely extend from the transverse stem 195 or the longitudinal stem 197 in the left lower direction, and the minute branches 199 of the sub-region positioned at the lower right obliquely extend from the transverse stem 195 or the longitudinal stem 197 in the right lower direction.

A pitch of the minute branches 199 and the minute slits 91 may be about 5 µm to about 8 µm, but is not limited thereto. Also, a ratio of the widths of the minute branches 199 and the minute slits 91 may be about 1.5:1 to about 1:1.5, but is not limited thereto and may be controlled by considering the display characteristics.

A maximum value of a length L1 of the minute branch 199 may be about 53 µm, and in this case, the pitch of the minute branches 199 and the minute slits 91 may be about 5 µm to about 6 µm. That is, the length of the longest minute branch 199 that starts from the center of the cross stem among the minute branches 199 may be equal to or less than about 53 µm. This is data obtained by simulation and experiments to determine a condition of the minute branches 199 without a reduction of transmittance of the liquid crystal display according to an exemplary embodiment of the present invention while not using a pretilt of a liquid crystal using an alignment aid that will be described later. If the pitch of the minute branches 199 and minute slits 91 is changed, the maximum length of the minute branch 199 may be changed.

The width of the transverse stem 195 or the longitudinal stem 197 of the unit pixel electrode UP may be about 4 µm to about 6 µm, but is not limited thereto.

The acute angle between the minute branch 199 and the transverse stem 195 may be about 40 degrees to about 45 degrees, however it is not limited thereto and may be controlled by considering the display characteristics such as the visibility of the liquid crystal display.

An end of at least a portion among the plurality of minute branches 199 may be connected through a connection (not shown) with a straight line shape. For example, at least portions of the ends of the minute branches 199 positioned at the upper end of the lower electrode 191, the ends of the minute branches 199 positioned at the lower end thereof, and the ends of the minute branches 199 positioned at the left end thereof, or the ends of the minute branches 199 positioned at the right end thereof are connected thereby forming an outer frame of the lower electrode 191.

The unit pixel electrode UP shown in FIG. 1 also forms a unit pixel electrode UP as a unit of the lower electrode according to various exemplary embodiments that will be described later.

Again referring to FIG. 5, referring to the upper panel 200, a color filter 230 and a light blocking member 220 may be positioned on an insulating substrate 210. The light blocking member 220 is referred to as a black matrix, and prevents light leakage between the lower electrodes 191. Each of the color filters 230 may display one of primary colors such as three primary colors of red, green, and blue.

At least one of the light blocking member 220 and the color filter 230 may be positioned at the lower panel 100.

An overcoat 250 is positioned on the color filter 230 and the light blocking member 220, and an upper electrode 270 is positioned on the overcoat 250. The upper electrode 270 may be made of a transparent conductor or metal such as ITO and IZO. The upper electrode 270 may receive a common voltage Vcom.

Referring to FIG. 2, the upper electrode 270 positioned at one pixel PX is the approximate quadrangle and includes a cross-shaped opening including a transverse opening 75 and a longitudinal opening 77 intersecting the transverse opening 75. The upper electrode 270 of one pixel PX may be divided into four sub-regions by the cross-shaped opening.

The width of the transverse opening 75 of the upper electrode 270 and the width of the longitudinal opening 77 may or may not be the same according to the display characteristics of the liquid crystal display. The width of the cross-shaped openings 75 and 77 of the upper electrode 270 may be narrowed than the width of the transverse stem 195 or the longitudinal stem 197 of the lower electrode. The width of the cross-shaped openings 75 and 77 of the upper electrode 270 may be about 3 µm to about 5 µm, but is not limited thereto.

The upper electrode 270 of FIG. 2 forms an upper unit electrode UC as a unit of the upper electrode according to the various exemplary embodiments that will be described later.

Referring to FIG. 1 to FIG. 3, the cross-shaped stems 195 and 197 of the lower electrode 191 and the cross-shaped openings 75 and 77 of the upper electrode 270 are aligned to face each other, and four sub-regions of the lower electrode 191 and four sub-regions of the upper electrode 270 respectively face each other. The cross-shaped openings 75 and 77 of the upper electrode 270 may extend in parallel to the cross-shaped stems 195 and 197 of the lower electrode 191, respectively.

Again referring to FIG. 5, alignment layers 11 and 21 are positioned on the insides of the two display panels 100 and 200, and they may be vertical alignment layers.

A polarizer (not shown) is disposed at the outside of at least one of the display panels 100 and 200, and polarization axes of the two polarizers are perpendicular to each other and one polarization axis of them is preferably parallel to the gate line 121.

The liquid crystal layer 3 positioned between two display panels 100 and 200 includes liquid crystal molecules 31 having a negative dielectric anisotropy. The liquid crystal molecules 31 are arranged such that a longitudinal axis thereof may be perpendicular to the surfaces of the two display panels 100 and 200 in the absence of an electric field. The initial alignment of the liquid crystal molecules 31 of one unit pixel may not be differentiated between the sub-regions, and the liquid crystal molecules 31 may not have pretilt in the length direction of the minute branch 199 with respect to the surface of the display panels 100 and 200. That is, it is not necessary for the liquid crystal layer 3 or the alignment layers 11 and 21 to include an alignment aid that may have been hardened to provide the pretilt to the liquid crystal molecules 31 like a conventional art.

Next, a driving method of the liquid crystal display according to an exemplary embodiment of the present invention will be described with reference to FIG. 6A and FIG. 6B as well as FIG. 1 to FIG. 5.

Figure 6A:
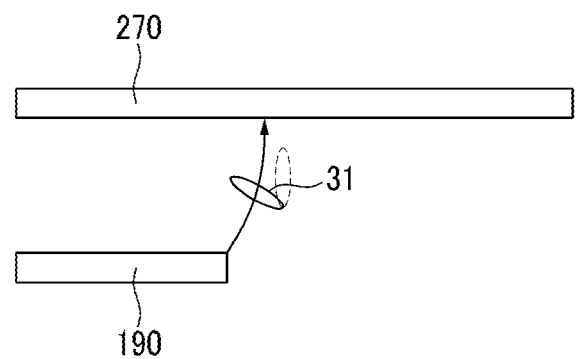
Figure 6B:
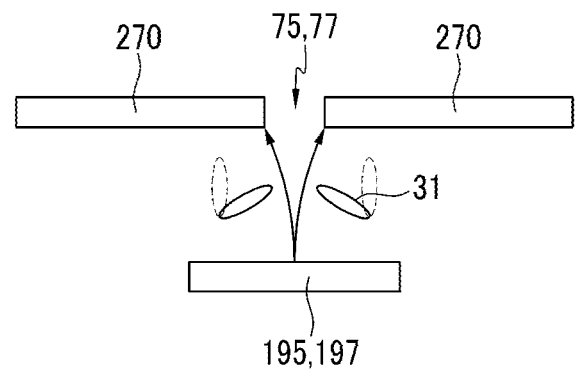

FIG. 6A and FIG. 6B are views showing a fringe field formed by the lower electrode and the upper electrode of the liquid crystal display according to an exemplary embodiment of the present invention.

If a gate-on voltage Von is applied to a gate electrode 124 of the thin film transistor Q to turn on the thin film transistor Q the data voltage is applied to the lower electrode 191. The lower electrode 191 applied with the data voltage and the upper electrode 270 applied with the common voltage Vcom together generate the electric field to the liquid crystal layer 3.

The electric field includes a vertical component of a direction approximately perpendicular to the surfaces of the display panels 100 and 200, and the liquid crystal molecules 31 tend to be inclined in the direction approximately parallel to the surfaces of the display panels 100 and 200 by the vertical component of the electric field. Also, referring to FIG. 6A and FIG. 6B, the edge of the minute branch 199 of the lower electrode 191 and the cross-shaped openings 75 and 77 of the upper electrode 270 generate the fringe field. In detail, referring to FIG. 6A, the liquid crystal molecules 31 positioned near the edge of the minute branch 199 are inclined toward the inside of the minute branch 199 of the lower electrode 191 by the fringe field. Referring to FIG. 6B, liquid crystal molecules 31 positioned near the edge of the cross-shaped openings 75 and 77 of the upper electrode 270 are inclined toward the inside of the cross-shaped openings 75 and 77 of the liquid crystal molecules 31 by the fringe field.

Resultantly, by this fringe field, the liquid crystal molecules 31 are inclined toward the center portion of the cross-shaped stem 195 and 197 in the direction approximately parallel to the minute branches 199. Accordingly, the inclination directions (referred to as an arrangement direction) of the liquid crystal molecules 31 are different in the four sub-regions of the lower electrode 191 and the upper electrode 270.

According to an exemplary embodiment of the present invention, the cross-shaped openings 75 and 77 facing the cross-shaped stems 195 and 197 of the lower electrode 191 are formed in the upper electrode 270 such that a control force (referred to as a liquid crystal control force) of the arrangement direction of the liquid crystal molecules 31 to be inclined approximately parallel to the minute branch 199 may be reinforced. Particularly, the control force of the liquid crystal molecules 31 may be sufficiently obtained without formation of a conventional alignment aid to obtain a fast response speed by providing the pretilt to the liquid crystal molecules 31 in the alignment layers 11 and 21 or in the liquid crystal layer 3.

To provide the sufficient liquid crystal control force and sufficient transmittance according thereto to the liquid crystal display according to an exemplary embodiment of the present invention, by limiting the length of the minute branch 199 of the lower electrode 191 to about 53 μm at a maximum, texture generation and a luminance reduction may be reduced. However, if design parameters such as the pitch of the minute branches 199 and the minute slits 91 are changed, the maximum length of the minute branch 199 optimizing the transmittance may also be changed.

One pixel PX may include one unit pixel. To obtain the sufficient liquid crystal control force for the liquid crystal molecules 31 without the transmittance reduction of one pixel PX, the one pixel PX may include a plurality of unit pixel electrodes UP and upper unit electrodes UC when the size of the pixel PX is increased. This will be described later.

As described above, the liquid crystal display according to an exemplary embodiment of the present invention does not require an additional process such as the hardening process of the alignment aid to form the pretilt of the liquid crystal molecules 31. Accordingly, the number of manufacturing steps of the liquid crystal display may be reduced and the manufacturing process may be simplified.

Next, a liquid crystal display according to an exemplary embodiment of the present invention will be described with reference to FIG. 7 to FIG. 9. The same constituent elements as of the previous exemplary embodiment are indicated by the same reference numerals, and the same description is omitted.

Figure 7:
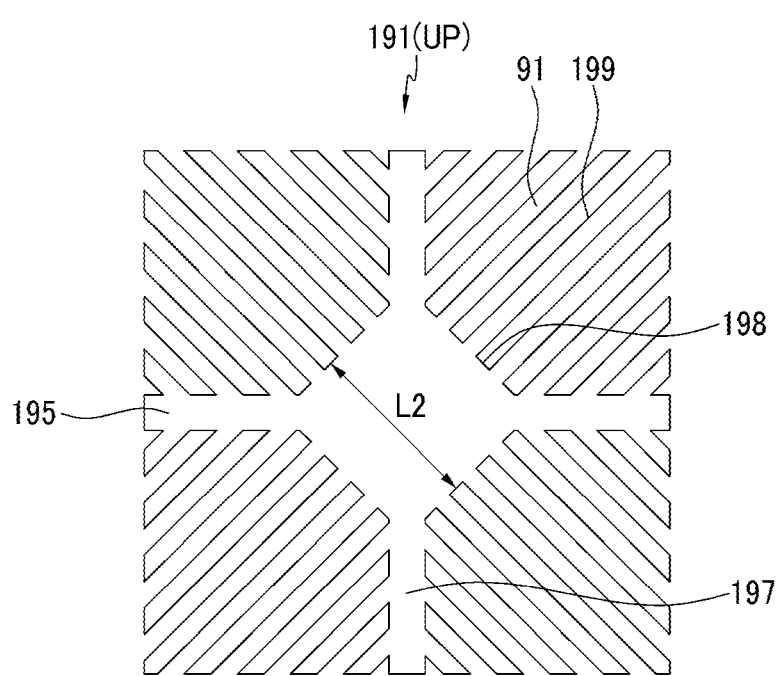
FIG. 7, FIG. 10, FIG. 13, and FIG. 16 are top plan views of a lower electrode of a liquid crystal display according to an exemplary embodiment of the present invention.
Figure 8:
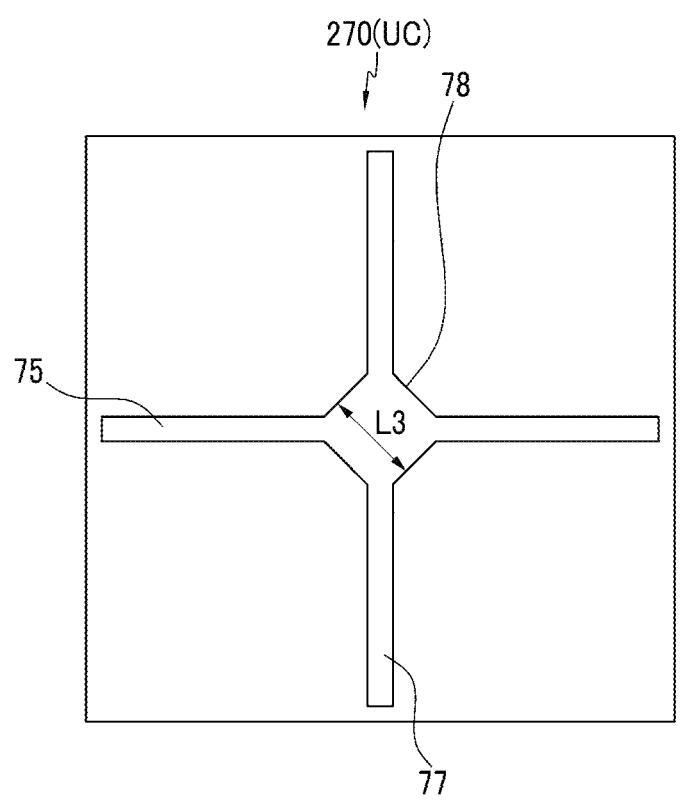
FIG. 8, FIG. 11, FIG. 14, and FIG. 17 are top plan views of an upper electrode of a liquid crystal display according to an exemplary embodiment of the present invention.
Figure 9:
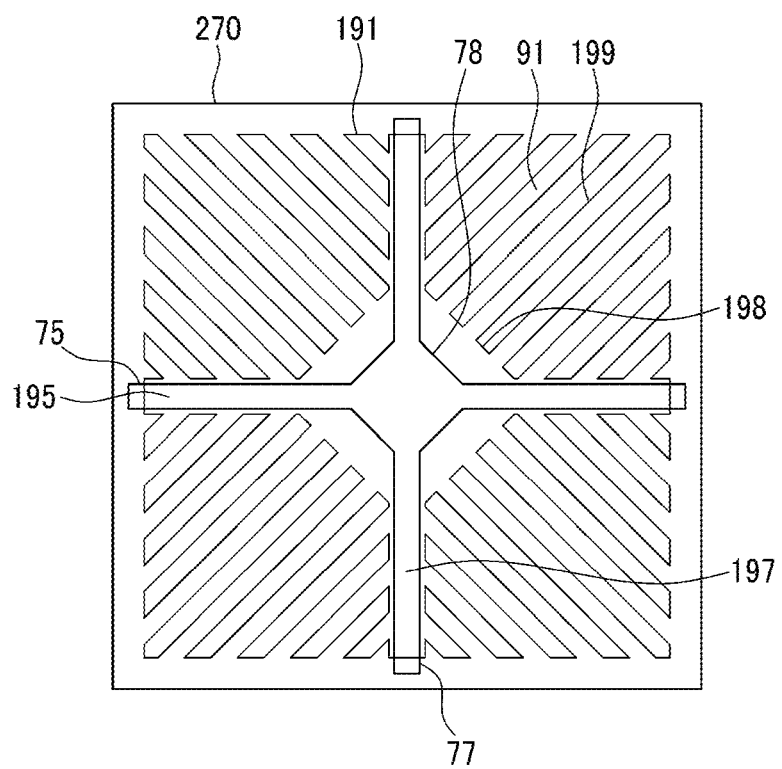
FIG. 9, FIG. 12, FIG. 15, and FIG. 18 are top plan views of the lower electrode of FIG. 7 and the upper electrode of FIG. 8, the lower electrode of FIG. 10 and the upper electrode of FIG. 11, the lower electrode of FIG. 13 and the upper electrode of FIG. 14, and the lower electrode of FIG. 16 and the upper electrode of FIG. 17, respectively.

FIG. 7 is a top plan view of a lower electrode of a liquid crystal display according to an exemplary embodiment of the present invention, FIG. 8 is a top plan view of an upper unit electrode UC of a liquid crystal display according to an exemplary embodiment of the present invention, and FIG. 9 is a top plan view showing the lower electrode of FIG. 7 and the upper electrode of FIG. 8 together.

Referring to FIG. 7, the lower electrode 191 according to the present exemplary embodiment is the same as most of the lower electrode 191 according to the previous exemplary embodiment, however the unit pixel electrode UP includes a center pattern 198 as an electrode positioned at the center portion of the cross-shaped stems 195 and 197. The center pattern 198 may be a polygon including four straight edges that are respectively positioned at four sub-regions of the unit pixel electrode UP, for example, a rhombus. The vertex of the center pattern 198 may be positioned on the cross-shaped stems 195 and 197 of the unit pixel electrode UP. The length L2 of one edge of the center pattern 198 or the distance L2 between two facing edges may be about 20 μm to about 40 μm, and in this case, the pitch of the minute branches 199 and the minute slits 91 may be about 5 μm to about 6 μm. However, the length L2 of one edge of the center pattern 198 is not limited thereto.

As described above, if the unit pixel electrode UP includes the center pattern 198, the liquid crystal control force is reinforced through the fringe field of the edge of the center pattern 198 such that the transmittance of the liquid crystal display may be further increased.

Referring to FIG. 8 and FIG. 9, the upper electrode 270 according to the present exemplary embodiment is the same as most of the upper electrode 270 according to the previous exemplary embodiment, however as shown in FIG. 7, when the unit pixel electrode UP has the center pattern 198, a center opening 78 positioned at the center portion of the cross-shaped opening 75 and 77 may be included.

The center pattern 78 may be a polygon including four straight edges that are respectively positioned at four sub-regions of the upper electrode 270, for example, a rhombus. The vertex of the center opening 78 may be positioned on the cross-shaped openings 75 and 77 of the upper electrode 270. The length L3 of the one edge of the center opening 78 or and the distance L3 between two facing edges may be smaller than the length L2 of one edge of the center pattern 198 of the unit pixel electrode UP. That is, the edge of the center opening 78 of the upper electrode 270 may be positioned inside the edge of the center pattern 198 of the unit pixel electrode UP.

As described above, if the upper electrode 270 includes the center opening 78, the liquid crystal control force is reinforced through the fringe field by the edge of the center opening 78 such that the transmittance of the liquid crystal display may be further increased. Particularly, when the size of the center pattern 198 of the lower electrode 191 increased, the control force of the liquid crystal molecules 31 positioned at the center portion of the lower electrode 191 may be further reinforced through the center opening 78 of the upper electrode 270, and the luminance reduction of the center portion of the cross-shaped stem 195 and 197 and the texture may be reduced.

Next, a liquid crystal display according to an exemplary embodiment of the present invention will be described with reference to FIG. 10 to FIG. 18. Like reference numerals are assigned to the same constituent elements as in the previous exemplary embodiment, and the same description is omitted.

Figure 10:
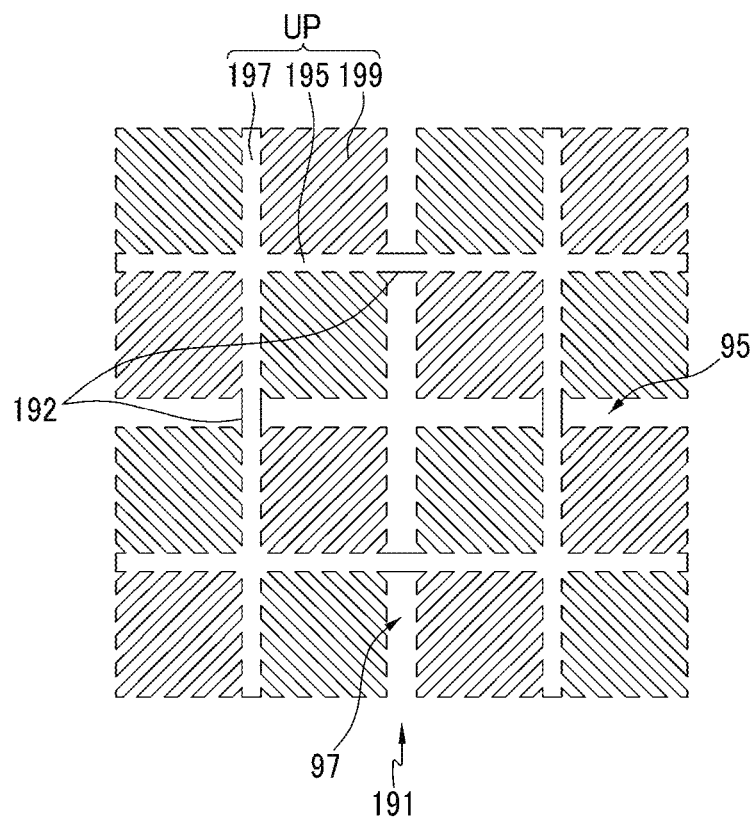
Figure 11:
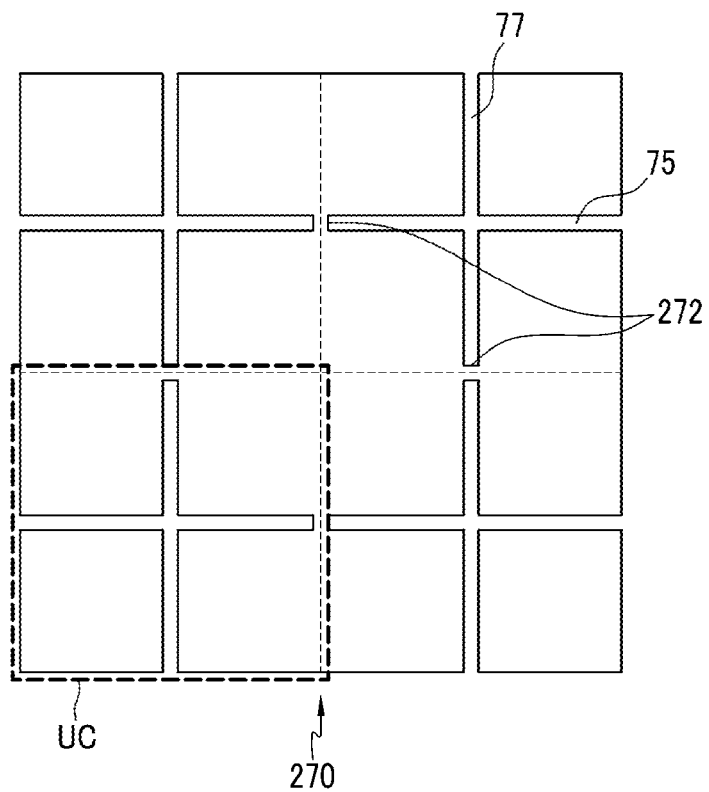
Figure 12:
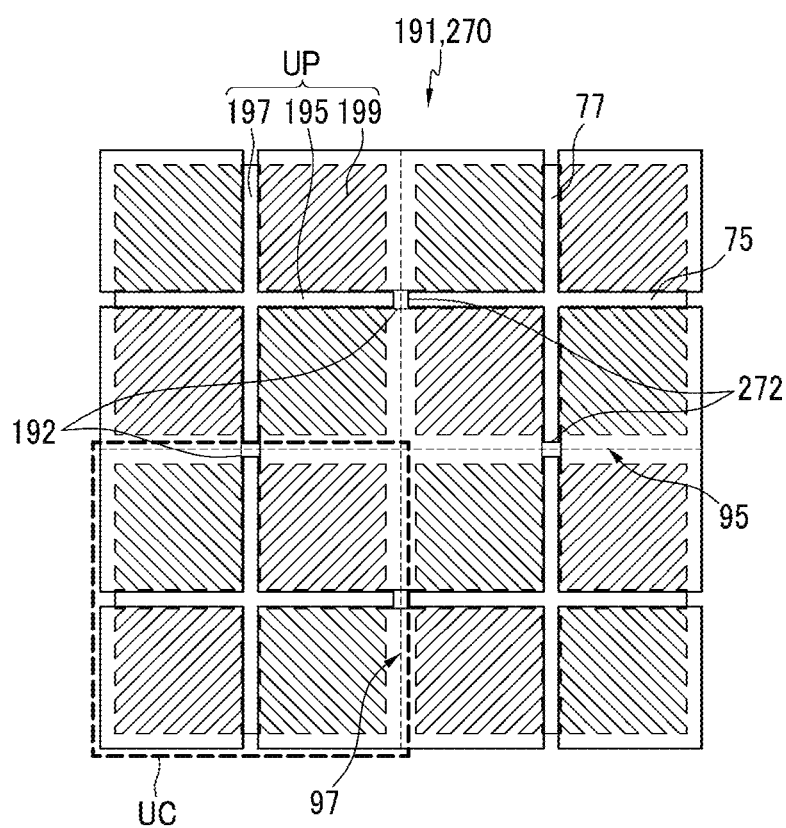
Figure 13:
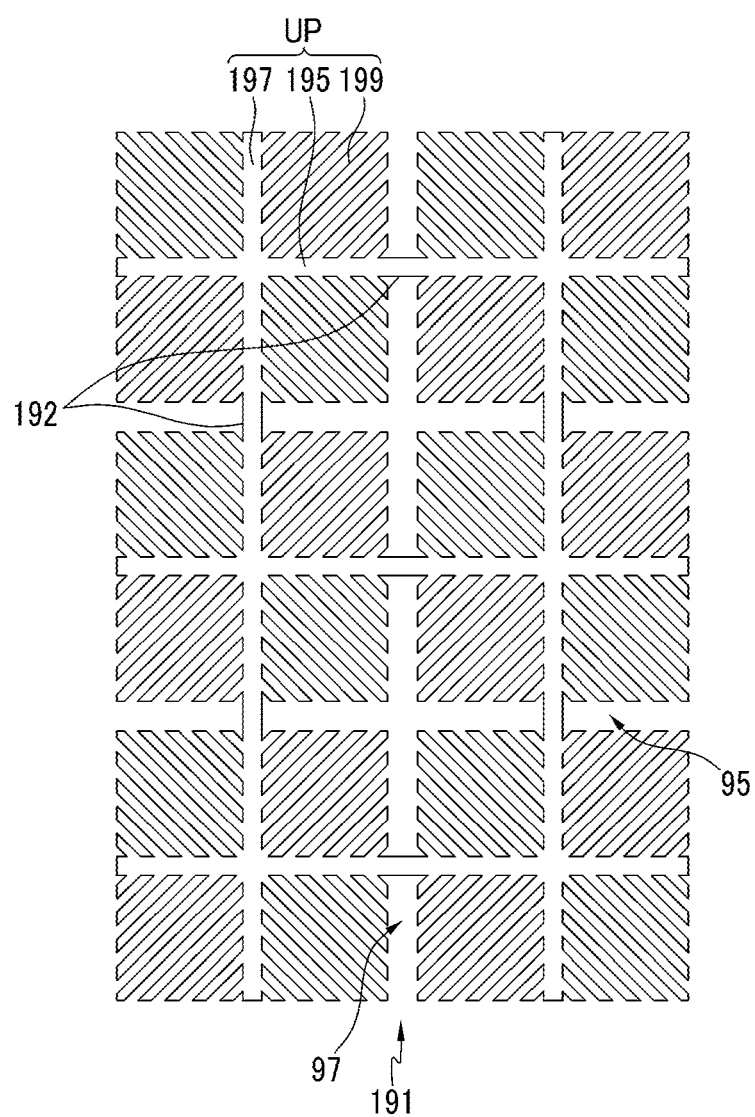
Figure 14:
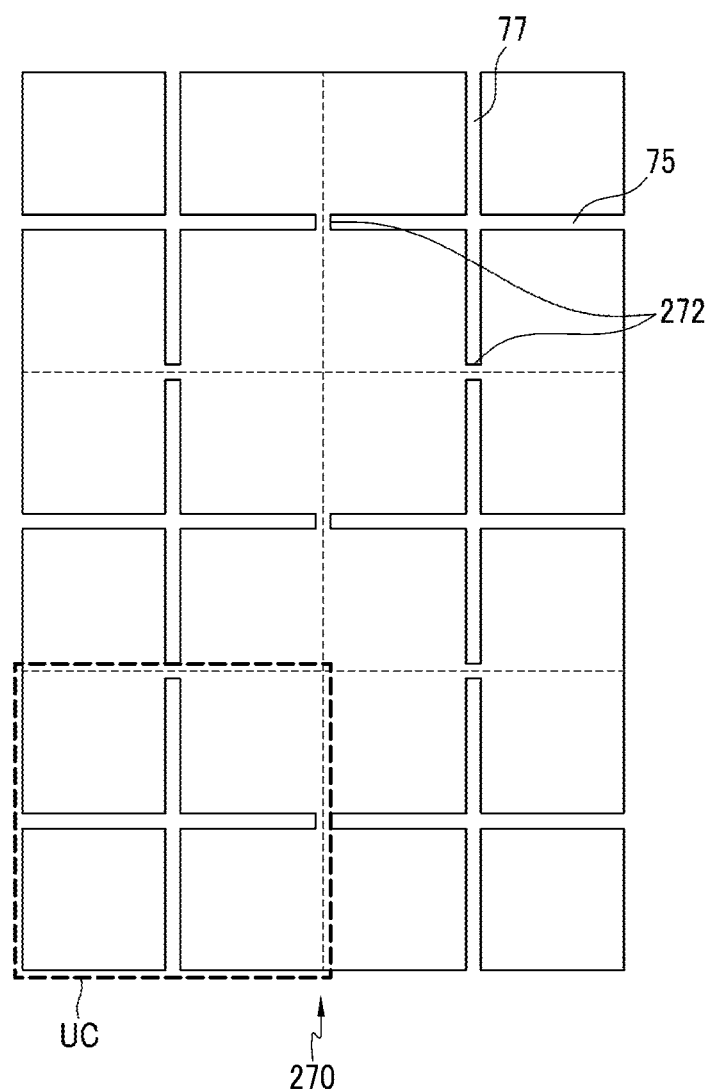
Figure 15:
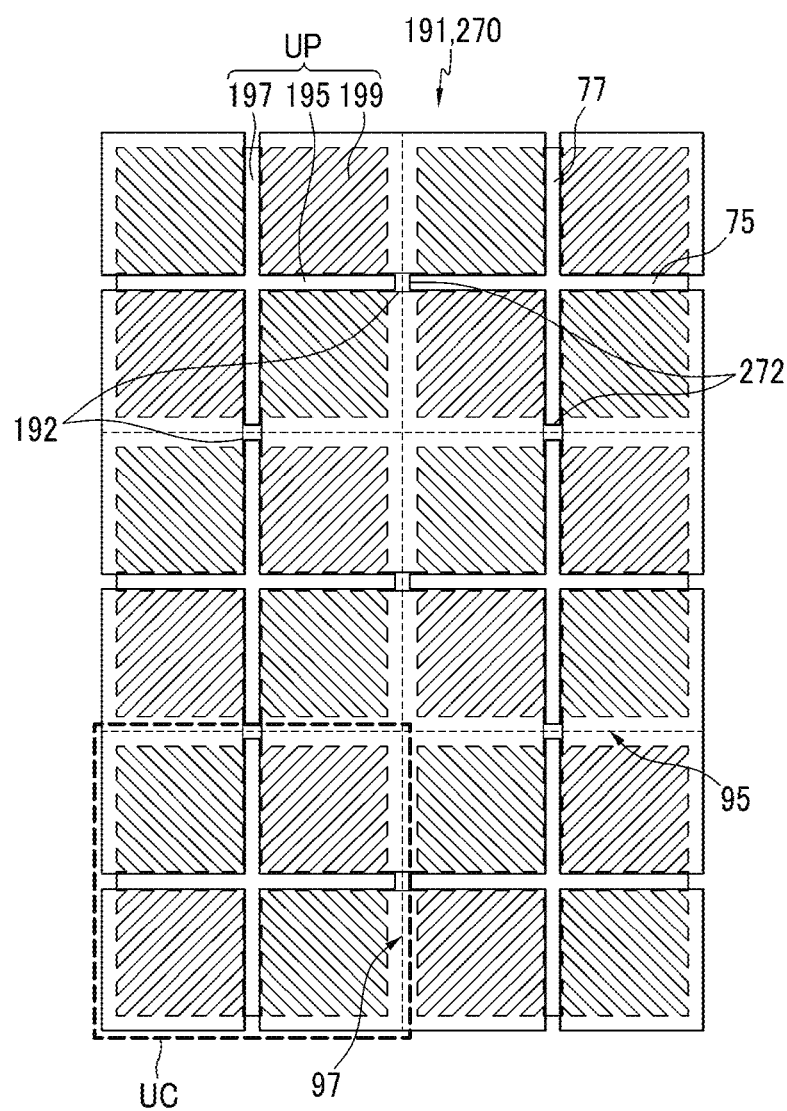
Figure 16:
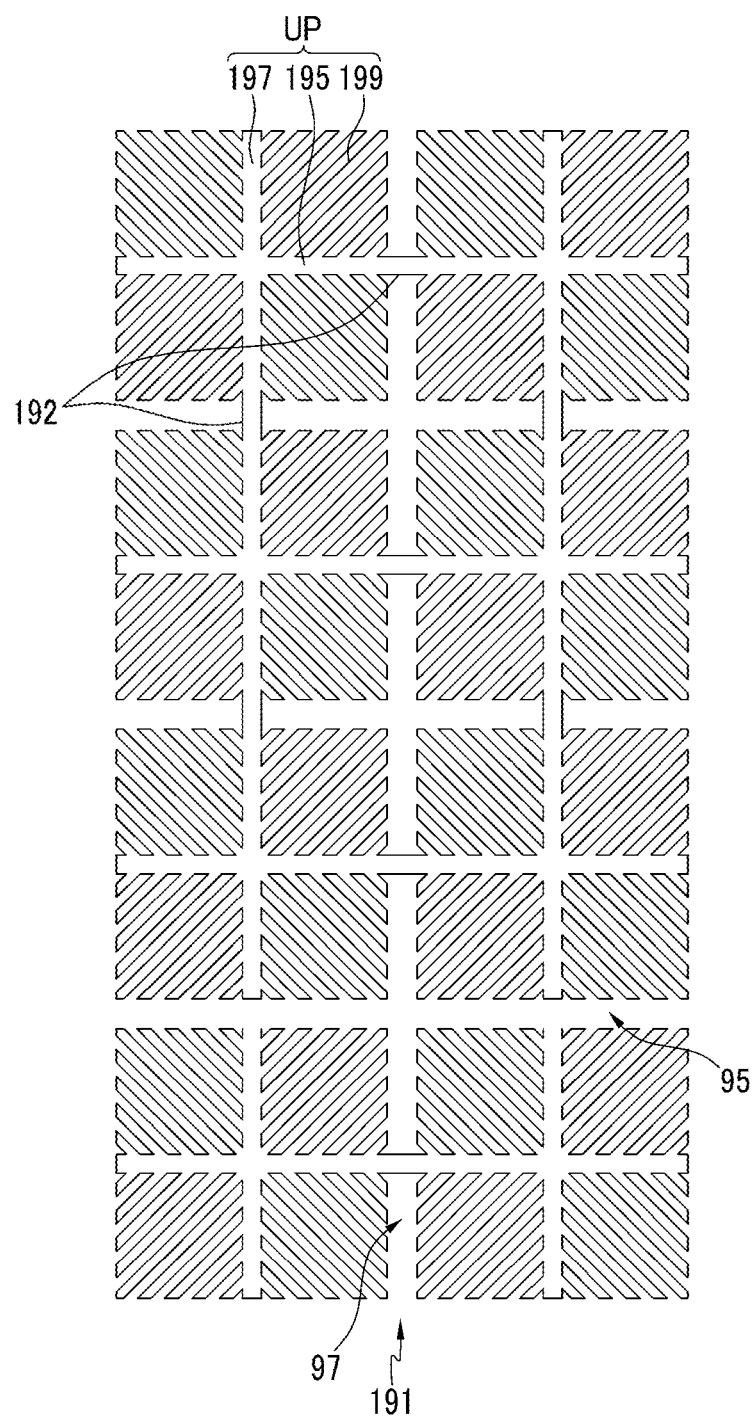
Figure 17:
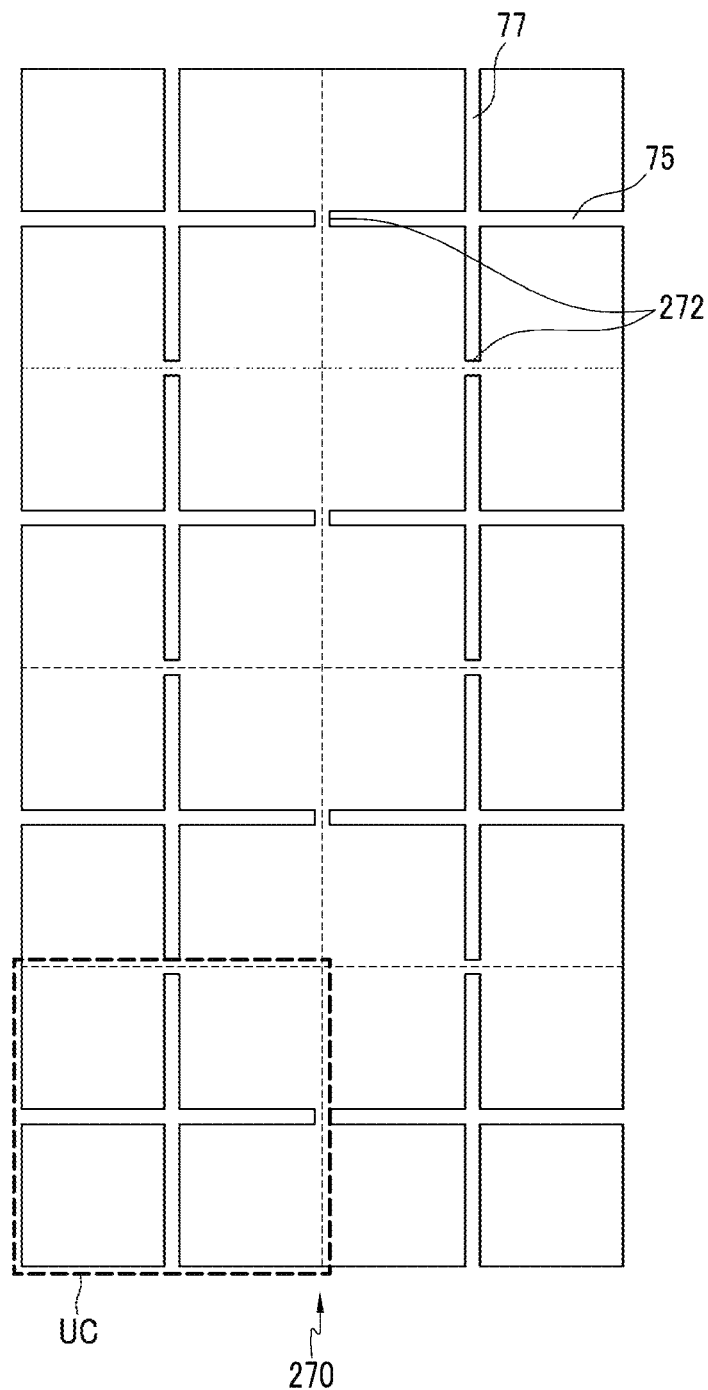
Figure 18:
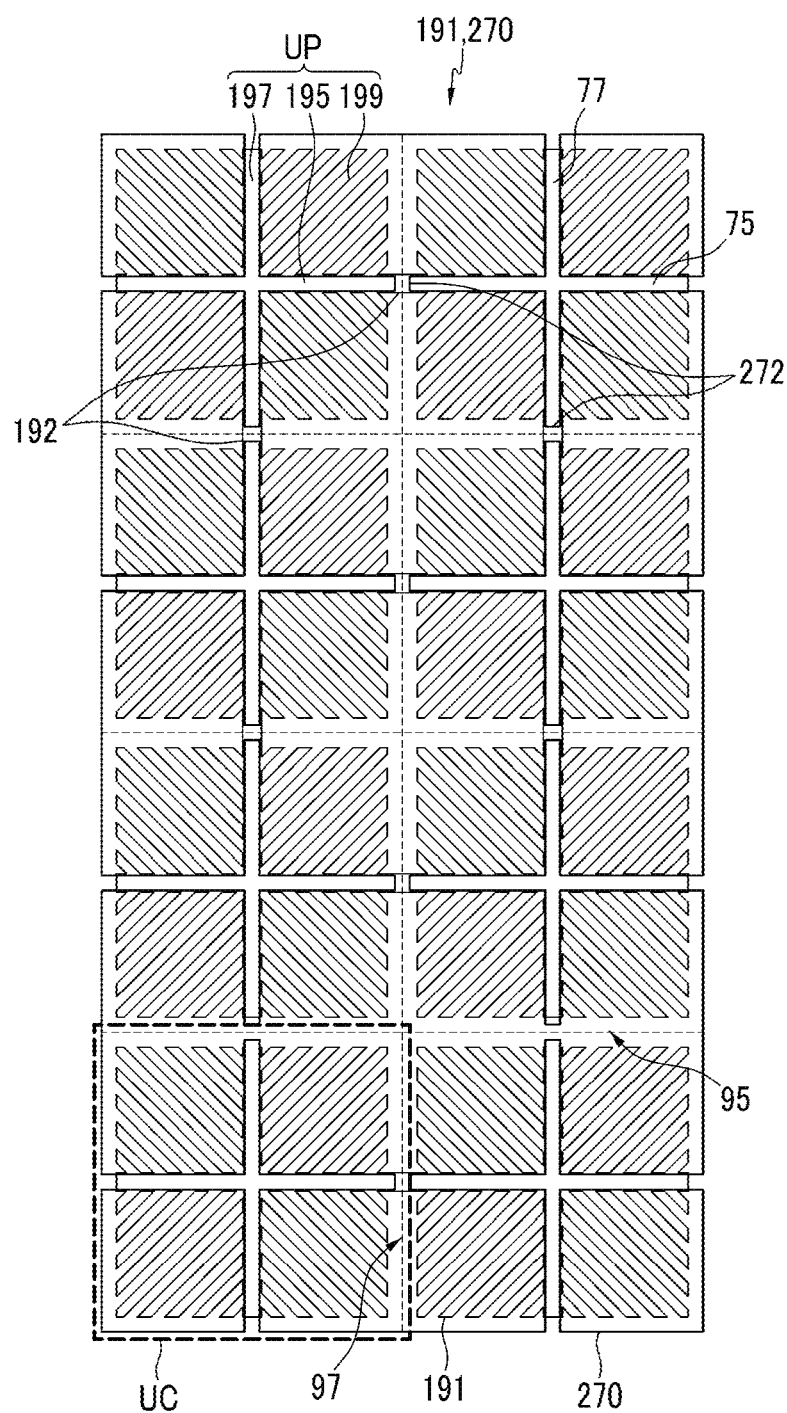

FIG. 10, FIG. 13, and FIG. 16 are top plan views of a lower electrode of a liquid crystal display according to an exemplary embodiment of the present invention, FIG. 11, FIG. 14, and FIG. 17 are top plan views of an upper electrode of a liquid crystal display according to an exemplary embodiment of the present invention, and FIG. 12, FIG. 15, and FIG. 18 are top plan views of the lower electrode of FIG. 7 and the upper electrode of FIG. 8, the lower electrode of FIG. 10 and the upper electrode of FIG. 11, the lower electrode of FIG. 13 and the upper electrode of FIG. 14, and the lower electrode of FIG. 16 and the upper electrode of FIG. 17, respectively.

Referring to FIG. 10 to FIG. 18, to obtain sufficient liquid crystal control force of one pixel PX, the lower electrode 191 for one pixel PX includes a plurality of unit pixel electrodes UP as shown in FIG. 1, and the upper electrode 270 for the pixel PX includes a plurality of upper unit electrodes UC shown in FIG. 2. The number of the unit pixel electrodes UP or the cross-shaped openings of the upper unit electrode UC included in one pixel PX may be different by considering the liquid crystal control force according to the area of the pixel PX.

FIG. 10 to FIG. 12 show an example in which one pixel PX includes four unit pixel electrode UP and four upper unit electrodes UC connected to each other, FIG. 13 to FIG. 15 show an example in which one pixel PX includes six unit pixel electrodes UP and six upper unit electrodes UC connected to each other, and FIG. 16 to FIG. 18 show an example in which one pixel PX includes eight unit pixel electrodes UP and eight upper unit electrodes UC connected to each other.

A plurality of unit pixel electrodes UP may be arranged in an approximate matrix, and the neighboring unit pixel electrodes UP are connected through at least one connection 192. The connection 192 may be positioned on an extending line of the cross-shaped stems 195 and 197 of the unit pixel electrode UP. That is, the connection 192 may have a shape protruded from the cross-shaped stem 195 and 197. Also, a space between the unit pixel electrode UP neighboring in a column direction, that is, the vertical direction, forms a transverse gap 95, and a space between the unit pixel electrode UP neighboring in a row direction, that is, in a horizontal direction, forms a longitudinal gap 97.

A portion of the ends of the minute branches 199 positioned at the outer boundary of the lower electrode 191 may be connected to each other. For example, at least portions among the ends of the minute branches 199 positioned at the upper end of the outer boundary of the lower electrode 191, the ends of the minute branches 199 positioned at the lower end of the outer boundary of the lower electrode 191, the ends of the minute branches 199 positioned at the left end of the outer boundary of the lower electrode 191, and the ends of the minute branches 199 positioned at the right end of the outer boundary of the lower electrode 191 are connected to each other, thereby forming the outer edge of the lower electrode 191.

A plurality of upper unit electrodes UC may be arranged in an approximate matrix, and the neighboring upper unit electrodes UC) are connected to each other. The cross-shaped openings 75 and 77 of the upper unit electrodes UC neighboring in the row direction or the column direction and facing each other may not be connected to each other. The portion between the cross-shaped openings 75 and 77 of the neighboring upper unit electrodes UC and facing each other may form a connection 272. That is, the connection 272 may be positioned on the extending line of the cross-shaped openings 75 and 77 of the upper unit electrodes UC. However, the cross-shaped openings 75 and 77 of the upper unit electrodes UC and facing each other may be connected.

Referring to FIG. 12, FIG. 15, and FIG. 18, each upper unit electrode UC of the upper electrode 270 and each unit pixel electrode UP of the lower electrode 191 are arranged to face each other. Also, the cross-shaped stems 195 and 197 of each unit pixel electrode UP of the lower electrode 191 and the cross-shaped openings 75 and 77 of each upper unit electrode UC of the upper electrode 270 face each other.

The unit pixel electrodes UP and the upper unit electrodes UC shown in FIG. 10 to FIG. 18 are applied with the characteristics and the effects of the several exemplary embodiments shown in FIG. 1 to FIG. 9. This is the same in exemplary embodiments that will be described later.

Next, a liquid crystal display according to an exemplary embodiment of the present invention will be described with reference to FIG. 19 and FIG. 20.

Figure 19:
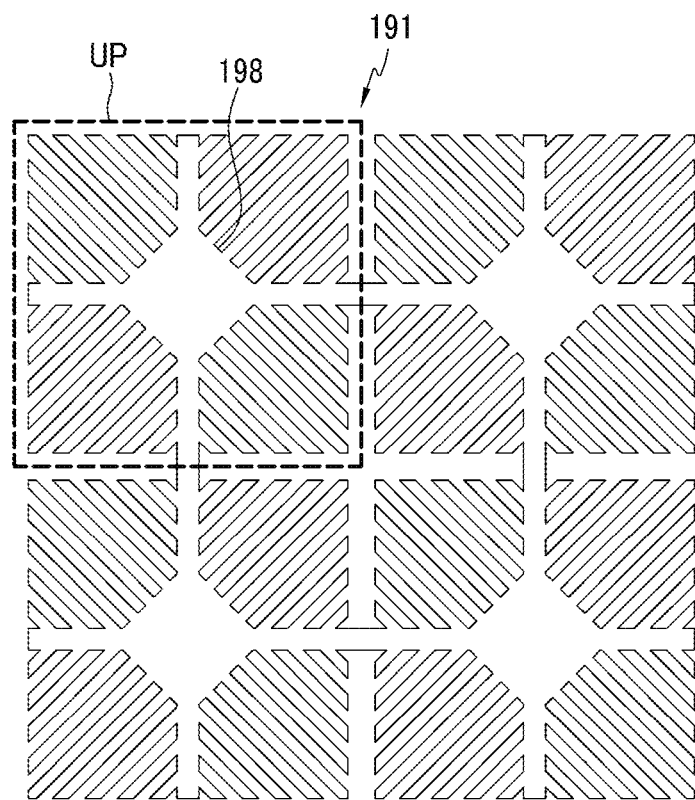
FIG. 19 is a top plan view of a lower electrode of a liquid crystal display according to an exemplary embodiment of the present invention.
Figure 20:
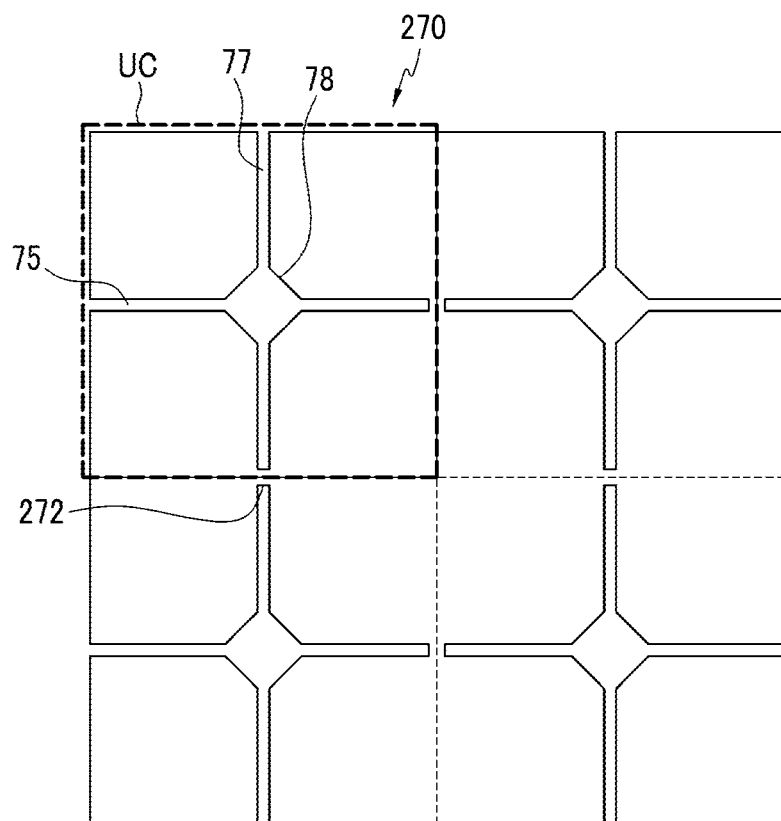
FIG. 20 is a top plan view of an upper electrode of a liquid crystal display according to an exemplary embodiment of the present invention.

FIG. 19 is a top plan view of a lower electrode of a liquid crystal display according to an exemplary embodiment of the present invention, and FIG. 20 is a top plan view of an upper electrode of a liquid crystal display according to an exemplary embodiment of the present invention.

Referring to FIG. 19, the lower electrode 191 for one pixel PX according to the present exemplary embodiment is the same as most of the exemplary embodiment shown in FIG. 10 to FIG. 18, however as shown in FIG. 7, the center pattern 198 positioned at the center portion of the cross-shaped stems 195 and 197 of each unit pixel electrode UP is included.

Referring to FIG. 20, the upper electrode 270 for one pixel PX according to the present exemplary embodiment is the same as most of the exemplary embodiment shown in FIG. 10 to FIG. 18, however as shown in FIG. 8 and FIG. 9, when the lower electrode 191 includes the center pattern 198, the center opening 78 positioned at the center portion of the cross-shaped openings 75 and 77 of each upper unit electrode UC may be further included.

The characteristics of the center pattern 198 and the center opening 78 and the effects according thereto are the same as the previous exemplary embodiment such that the detailed description is omitted.

Next, a liquid crystal display according to an exemplary embodiment of the present invention will be described with reference to FIG. 21A to FIG. 21D.

FIG. 21A to FIG. 21D are plan views showing a lower electrode and an upper electrode together according to a liquid crystal display according to an exemplary embodiment of the present invention, and a photograph of one pixel of an actual liquid crystal display.

Figure 21A:
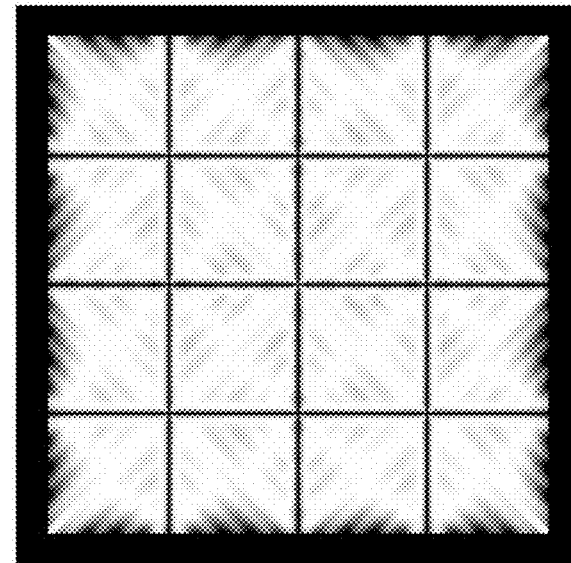
FIG. 21A, FIG. 21B, FIG. 21C and FIG. 21D are plan views showing a lower electrode and an upper electrode together according to a liquid crystal display according to an exemplary embodiment of the present invention and a photograph of one pixel of an actual liquid crystal display.
Figure 21A:
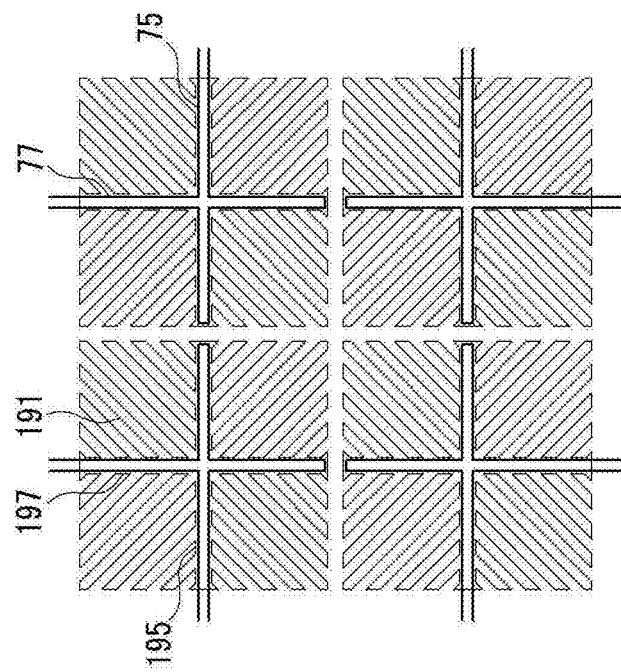
Figure 21B:
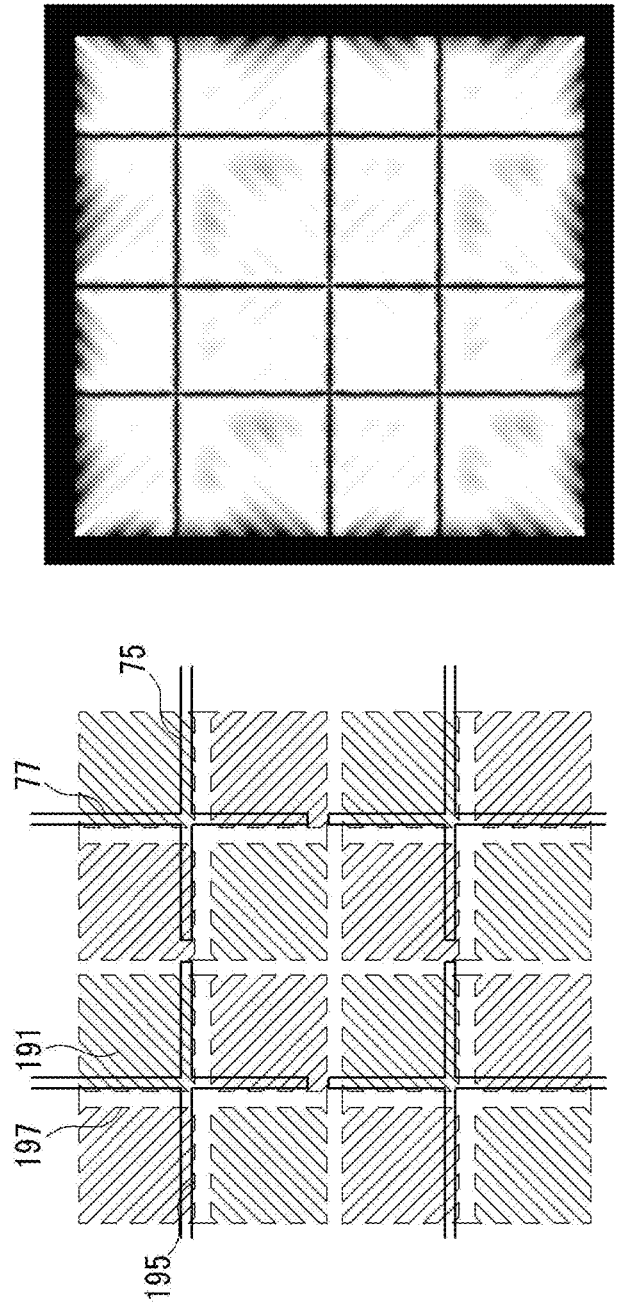

In detail, FIG. 21A shows the luminance of the actual liquid crystal display when the width of the cross-shaped stem 195 and 197 of the lower electrode 191 and the width of the cross-shaped opening 75 and 77 of the upper electrode 270 is about 5 μm in a state that the lower panel 100 and the upper panel 200 are aligned. FIG. 21B shows the state in which the lower panel 100 and the upper panel 200 of the liquid crystal display shown in FIG. 21A are misaligned and the luminance of the liquid crystal display according thereto. The misalignment degree is an example in which the upper panel 200 is shifted with regard to the lower panel 100 by about 7 μm to the right side and about 7 μm to the upper side.

Figure 21C:
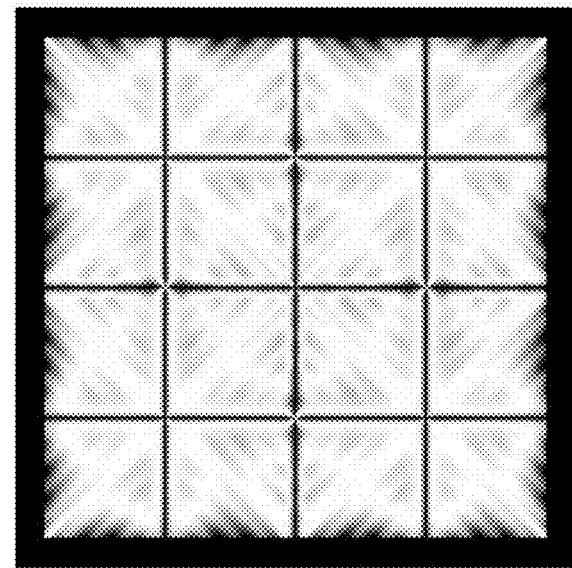
Figure 21C:
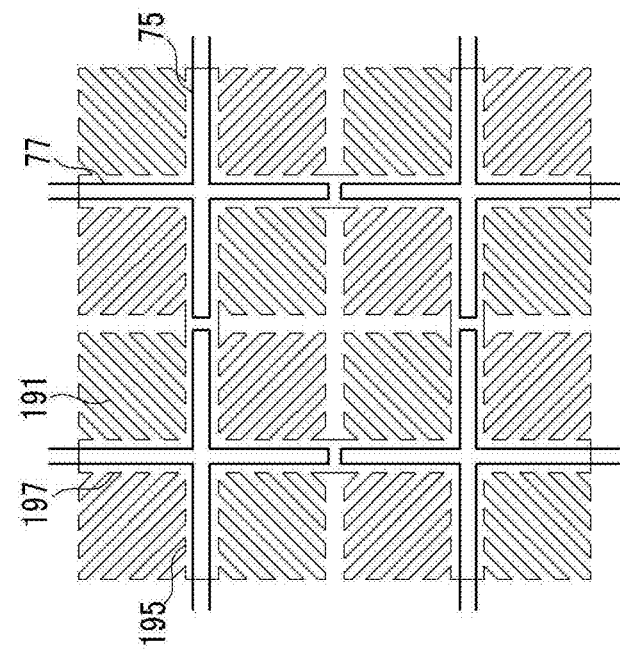
Figure 21D:
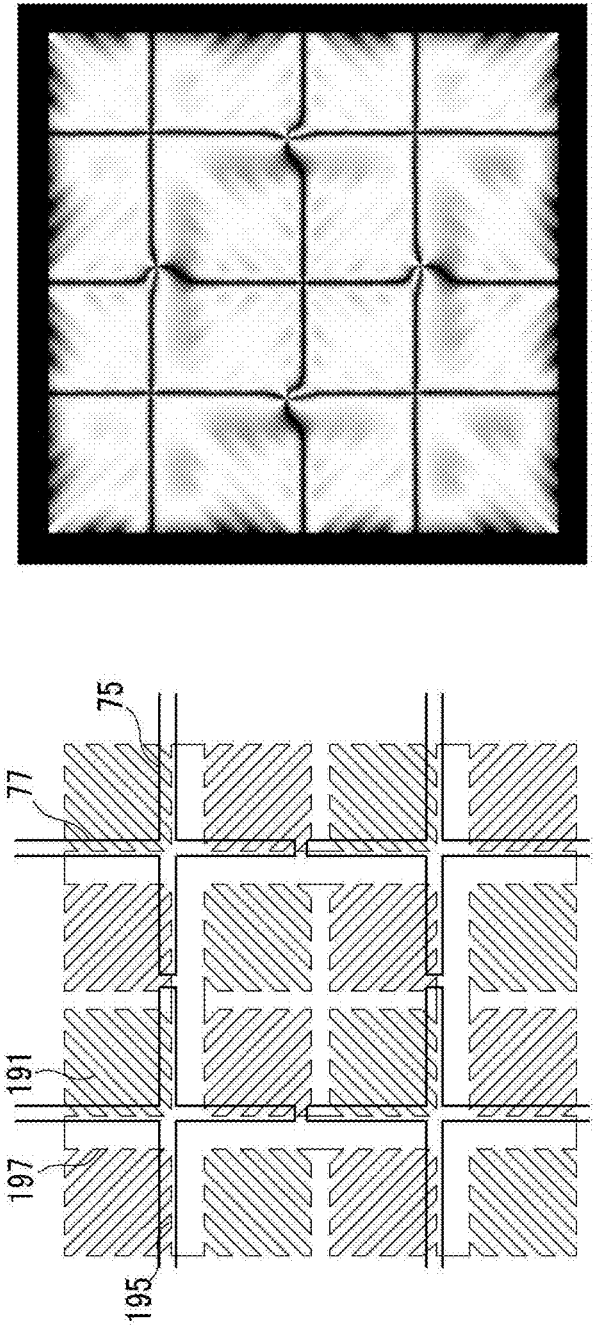

FIG. 21C shows the luminance of the actual liquid crystal display when the width of the cross-shaped stems 195 and 197 of the lower electrode 191 is about 10 μm and the width of the cross-shaped openings 75 and 77 of the upper electrode 270 is about 6 μm in a state in which the lower panel 100 and the upper panel 200 are aligned. FIG. 21D shows the state in which the lower panel 100 and the upper panel 200 of the liquid crystal display shown in FIG. 21C are misaligned and the luminance of the liquid crystal display according thereto. The misalignment degree is an example in which which the upper panel 200 is shifted with regard to the lower panel 100 by about 7 μm to the right side and about 7 μm to the upper side.

Referring to FIG. 21A to FIG. 21D, as the width of the cross-shaped stems 195 and 197 of the lower electrode 191 is decreased, the difference of the transmittance when the lower panel 100 and the upper panel 200 are misaligned is decreased. That is, when the lower panel 100 and the upper panel 200 are misaligned, to prevent a large deterioration of transmittance, it is advantage that the width of the cross-shaped stems 195 and 197 of the lower electrode 191 is smaller than the width of the cross-shaped openings 75 and 77 of the upper electrode 270. Furthermore, by reducing the width of the cross-shaped stems 195 and 197 of the lower electrode 191, the alignment margin of the lower panel 100 and the upper panel 200 may be increased.

Figure 22:
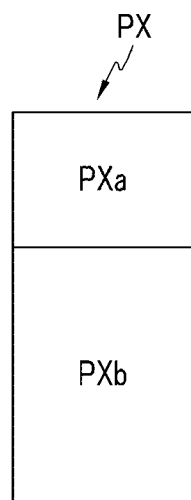
FIG. 22 is a view of two sub-pixels included in one pixel of a liquid crystal display according to an exemplary embodiment of the present invention.

FIG. 22 is a view of two sub-pixels included in one pixel of a liquid crystal display according to an exemplary embodiment of the present invention.

Referring to FIG. 22, one pixel PX of the liquid crystal display according to an exemplary embodiment of the present invention may include a first sub-pixel (PXa) and a second sub-pixel (PXb). The first sub-pixel (PXa) and the second sub-pixel (PXb) may display an image having different gamma curves for one input image signal or an image having the same gamma curve. That is, the first sub-pixel (PXa) and the second sub-pixel (PXb) of one pixel PX may display an image of different luminances to improve the lateral visibility for one input image signal. The areas of the first sub-pixel (PXa) and the second sub-pixel (PXb) may or may not be equal to each other.

As described above, the pixel PX including the first sub-pixel (PXa) and the second sub-pixel (PXb) may have various circuit structures and dispositions to display the image of different luminances.

Figure 23:
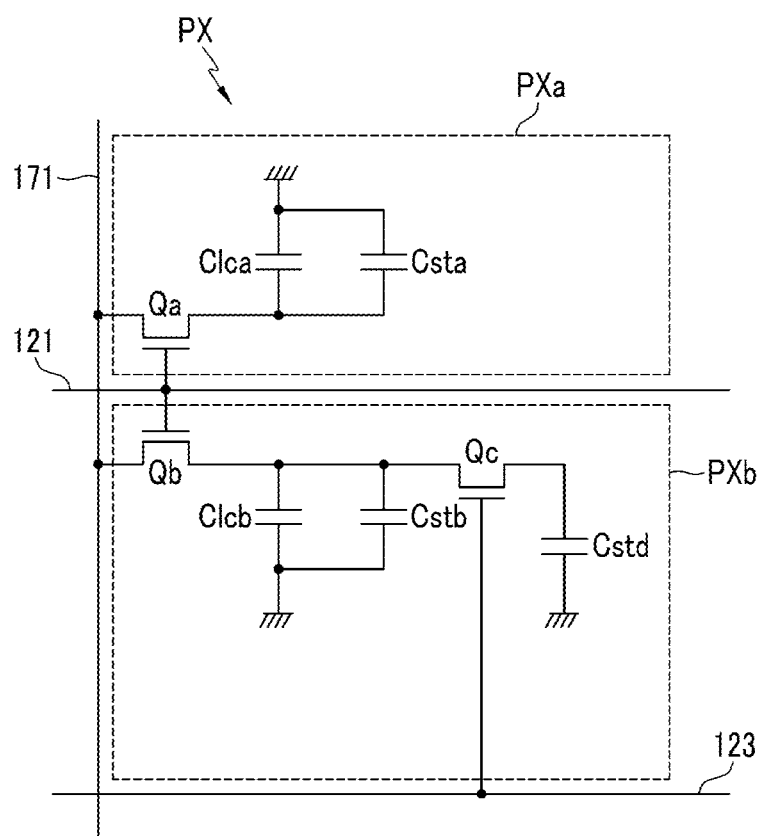
FIG. 23 is an equivalent circuit diagram of one pixel of a liquid crystal display according to an exemplary embodiment of the present invention.

FIG. 23 is an equivalent circuit diagram of one pixel of a liquid crystal display according to an exemplary embodiment of the present invention.

Referring to FIG. 23, a liquid crystal display according to an exemplary embodiment of the present invention includes signal lines including a gate line 121, a step-down gate line 123, and a data line 171, and a pixel PX connected thereto.

Each pixel PX includes first and second sub-pixels PXa and PXb. The first sub-pixel PXa includes a first switching element Qa, a first liquid crystal capacitor Clca, and a first storage capacitor Csta, and the second sub-pixel PXb includes second and third switching elements Qb and Qc, a second liquid crystal capacitor Clcb, a second storage capacitor Cstb, and a step-down capacitor Cstd.

The first and the second switching elements Qa and Qb are respectively connected to the gate line 121 and the data line 171, and the third switching element Qc is connected to the step-down gate line 123.

The first and the second switching elements Qa and Qb as three-terminal elements such as thin film transistors include the control terminal connected to the gate line 121, the input terminal connected to the data line 171, and the output terminal connected to the first and the second liquid crystal capacitors Clca and Clcb and the first and the second storage capacitors Csta and Cstb.

The third switching element Qc, also as a three-terminal element such as a thin film transistor, includes the control terminal connected to the step-down gate line 123, the input terminal connected to the second liquid crystal capacitor Clcb, and the output terminal connected to the step-down capacitor Cstd.

The step-down capacitor Cstd is connected to the output terminal of the third switching element Qc and the common voltage.

Referring the operation of the pixel PX, firstly, if the gate line 121 is applied with the gate-on voltage Von, the first and second thin film transistors Qa and Qb connected thereto are turned on. Accordingly, the data voltage of the data line 171 is applied to the first and the second liquid crystal capacitors Clca and Clcb through the turned-on first and second switching elements Qa and Qb such that the first and the second liquid crystal capacitors Clca and Clcb are charged with a voltage difference between the data voltage Vd and a common voltage Vcom. At this time, the step-down gate line 123 is applied with the gate-off voltage Voff.

Next, if the gate line 121 is applied with the gate-off voltage Voff, and simultaneously the step-down gate line 123 is applied with the gate-on voltage Von, the first and the second switching elements Qa and Qb connected to the gate line 121 are turned off, and the third switching element Qc is turned on. Accordingly, the charging voltage of the second liquid crystal capacitor Clcb connected to the output terminal of the second switching element Qb is decreased. Accordingly, in the case of a liquid crystal display driven by frame inversion, the charging voltage of the second liquid crystal capacitor Clcb may always be lower than the charging voltage of the first liquid crystal capacitor Clca. Accordingly, the charging voltages of the first and second liquid crystal capacitors Clca and Clcb are different such that the lateral visibility of the liquid crystal display may be improved.

Next, a liquid crystal display according to an exemplary embodiment of the present invention having a circuit structure shown in FIG. 23 will be described with reference to FIG. 24 and FIG. 25. The same constituent elements as in the previous exemplary embodiment are indicated by the same reference numerals, and the same description is omitted.

Figure 24:
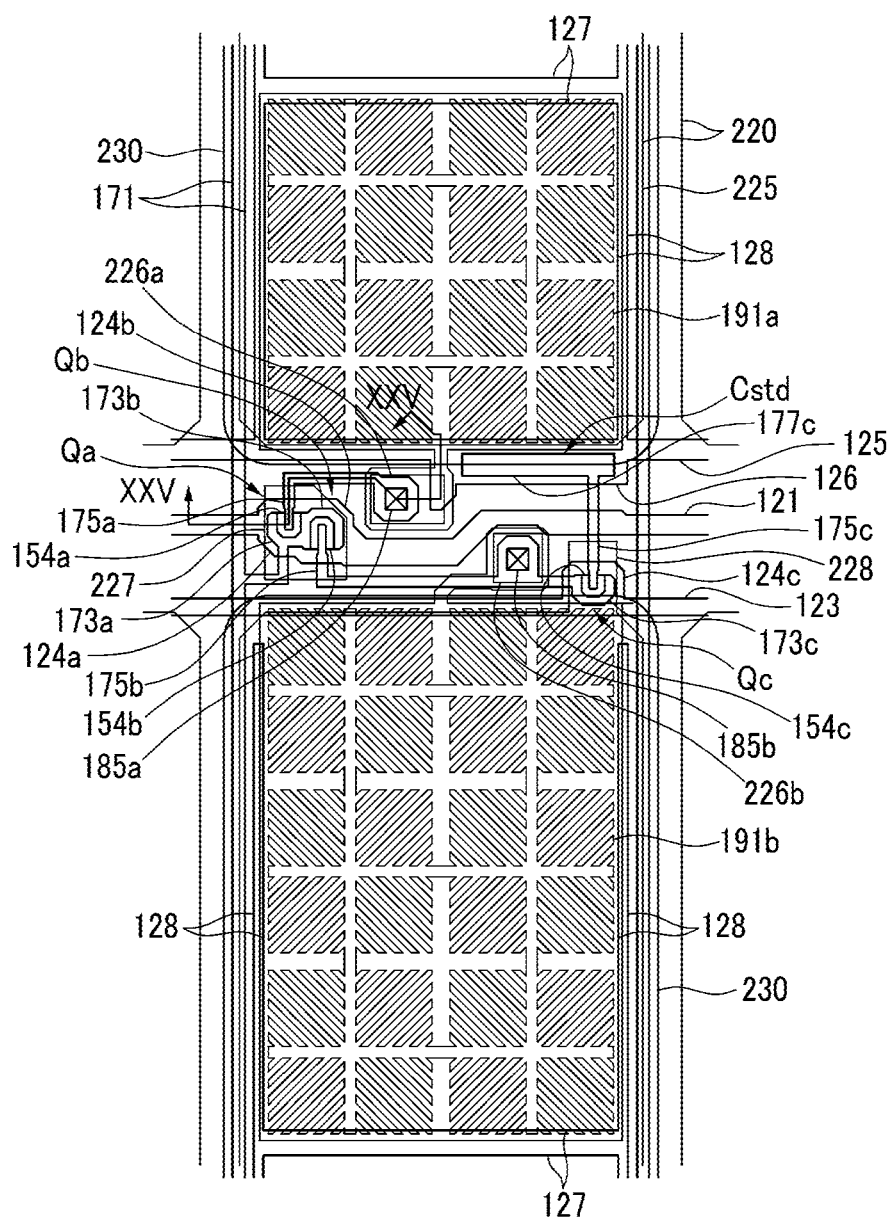
FIG. 24 is a top plan view of one pixel of a liquid crystal display according to an exemplary embodiment of the present invention.
Figure 25:
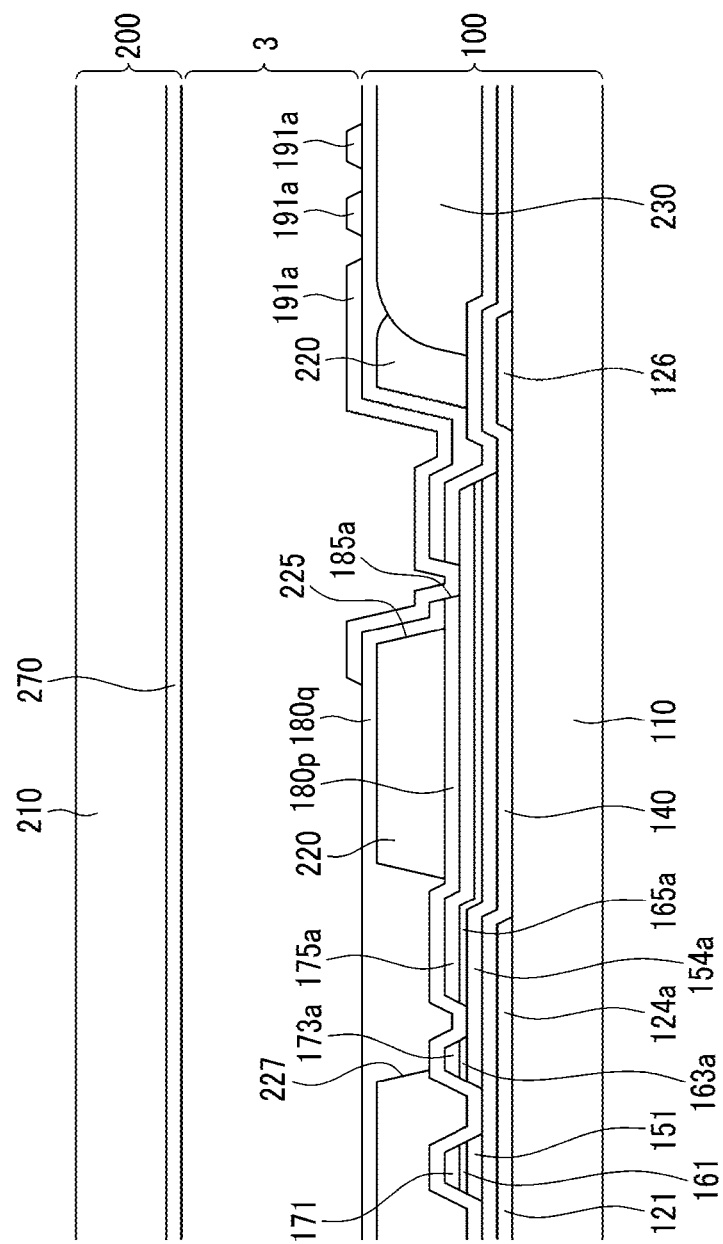
FIG. 25 is a cross-sectional view of the liquid crystal display of FIG. 24 taken along the line XXV-XXV.

FIG. 24 is a top plan view of one pixel of a liquid crystal display according to an exemplary embodiment of the present invention, and FIG. 25 is a cross-sectional view of the liquid crystal display of FIG. 24 taken along the line XXV-XXV.

The liquid crystal display according to an exemplary embodiment of the present invention includes the lower panel 100 and the upper panel 200, and the liquid crystal layer 3 interposed between the two display panels 100 and 200.

The liquid crystal layer 3 is the same as the exemplary embodiment shown in FIG. 1 to FIG. 5 such that the detailed description is omitted.

Referring to the lower panel 100, a plurality of gate conductors including gate lines 121, step-down gate lines 123, and storage electrode lines 125 are formed on an insulating substrate 110. The gate lines 121 and the step-down gate lines 123 transfer gate signals and mainly extend in a transverse direction. Each gate line 121 may include a first gate electrode 124a and a second gate electrode 124b, and each step-down gate line 123 may include a third gate electrode 124c. The first gate electrode 124a and the second gate electrode 124b are connected to each other. The storage electrode line 125 may extend mainly in a transverse direction and transmits a predetermined voltage such as a common voltage Vcom. The storage electrode line 125 includes a storage expansion 126, a pair of longitudinal portions 128 approximately vertical to the gate line 121, and a transverse portion 127 connecting a pair of longitudinal portions 128, however the structure of the storage electrode line 125 is not limited thereto.

A gate insulating layer 140 is formed on the gate conductors, and a semiconductor stripe 151 is disposed thereon. The semiconductor stripes 151 mainly extends in the vertical direction, and each semiconductor stripe 151 includes first and second semiconductors 154a and 154b extending toward the first and second gate electrodes 124a and 124b and connected to each other, and a third semiconductor 154c connected to the second semiconductor 154b.

An ohmic contact stripe 161 is formed on the semiconductor stripes 151, ohmic contacts 163a and 165a are formed on the first semiconductor 154a, and ohmic contacts are respectively formed on the second semiconductor 154b and the third semiconductor 154c. However, the ohmic contacts 161 and 165a may be omitted.

A data conductor including a data line 171, a first drain electrode 175a, a second drain electrode 175b, and a third drain electrode 175c is formed on the ohmic contacts 161 and 165a. Each data line 171 may include a first source electrode 173a and a second source electrode 173b extending toward the first gate electrode 124a and the second gate electrode 124b. Bar end portions of the first drain electrode 175a and the second drain electrode 175b are partially enclosed by the first source electrode 173a and the second source electrode 173b. A wide end portion of the second drain electrode 175b again extends thereby forming a third source electrode 173c of a "U" shape. A wide end 177c of the third drain electrode 175c overlaps the storage expansion 126 thereby forming a step-down capacitor Cstd, and the bar end portion is partially enclosed by the third source electrode 173c.

The first/second/third gate electrode 124a/124b/124c, the first/second/third source electrode 173a/173b/173c, and the first/second/third drain electrode 175a/175b/175c form a first/second/third thin film transistor (TFT) Qa/Qb/Qc along with the first/second/third semiconductor 154a/154b/154c, and a channel of the thin film transistor is respectively formed in the semiconductor 154a/154b/154c between the source electrode 173a/173b/173c and the drain electrode 175a/175b/175c.

A lower passivation layer 180p made of an inorganic insulator such as silicon nitride or silicon oxide is formed on the data conductors 171, 175a, 175b, and 175c and the exposed portions of the semiconductors 154a, 154b, and 154c, and a color filter 230 and a light blocking member 220 may be positioned thereon. The light blocking member 220 may include an opening 227 positioned on the first thin film transistor Qa and the second thin film transistor Qb, an opening 226a positioned on the wide end of the first drain electrode 175a, an opening 226b positioned on the wide end of the second drain electrode 175b, and an opening 228 positioned on the third thin film transistor Qc. Alternatively, at least one of the color filter 230 and the light blocking member 220 may be positioned in the upper panel 200.

An upper passivation layer 180q is formed on the color filter 230 and the light blocking member 220. The lower passivation layer 180p and the upper passivation layer 180q have a plurality of contact holes 185a and 185b respectively exposing the wide ends of the first drain electrode 175a and the second drain electrode 175b.

A lower electrode including a first sub-pixel electrode 191a and a second sub-pixel electrode 191b is formed on the upper passivation layer 180q. The first sub-pixel electrode 191a and the second sub-pixel electrode 191b may have the same structure as one of the lower electrodes 191 of the previous several exemplary embodiments, for example as shown in FIG. 1, FIG. 7, FIG. 10, FIG. 13, FIG. 16, or FIG. 19. Particularly, to improve the lateral visibility, when the area of the second sub-pixel electrode 191b is different from the area of the first sub-pixel electrode 191a, the first sub-pixel electrode 191a includes four unit pixel electrodes UP like the lower electrode 191 shown in FIG. 10, and the second sub-pixel electrode 191b may include six or eight unit pixel electrodes UP like the lower electrode 191 shown in FIG. 13 or FIG. 16. FIG. 24 shows an example in which the first sub-pixel electrode 191a includes four unit pixel electrodes UP, and the second sub-pixel electrode 191b includes six unit pixel electrodes UP.

The first sub-pixel electrode 191a receives the data voltage from the first drain electrode 175a through the contact hole 185a, and the second sub-pixel electrode 191b receives the data voltage from the second drain electrode 175b through the contact hole 185b.

Referring to the upper panel 200, an upper electrode 270 is positioned on an insulating substrate 210. The upper electrode 270 positioned in each sub-pixel PXa and PXb may have the same structure as one of the upper electrodes 270 of the previous several exemplary embodiments, for example as shown in FIG. 2, FIG. 8, FIG. 11, FIG. 14, FIG. 17, or FIG. 20. Particularly, to improve the lateral visibility, when the area of the second sub-pixel electrode 191b is different from the area of the first sub-pixel electrode 191a, the upper electrode 270 of the first sub-pixel PXa includes four upper unit electrodes UC like the lower electrode 191 shown in FIG. 11, and the upper electrode 270 of the second sub-pixel PXb may include six or eight upper unit electrodes UC like the upper electrode 270 shown in FIG. 14 or FIG. 17. In an example as shown in FIG. 24, the upper electrode 270 of the first sub-pixel PXa even not shown may include four upper unit electrodes UC, and the upper electrode 270 of the second sub-pixel PXb may include six upper unit electrodes UC.

The first sub-pixel electrode 191a and the upper electrode 270 form the first liquid crystal capacitor Clca along with the liquid crystal layer 3 interposed therebetween, and the second sub-pixel electrode 191b and the upper electrode 270 form the second liquid crystal capacitor Clcb along with the liquid crystal layer 3 interposed therebetween, thereby maintaining the voltage after the first and the second thin film transistors Qa and Qb are turned off. Also, the first and the second sub-pixel electrodes 191a and 191b overlap the storage electrode line 125 thereby forming the first and the second storage capacitors Csta and Cstb.

Figure 26:
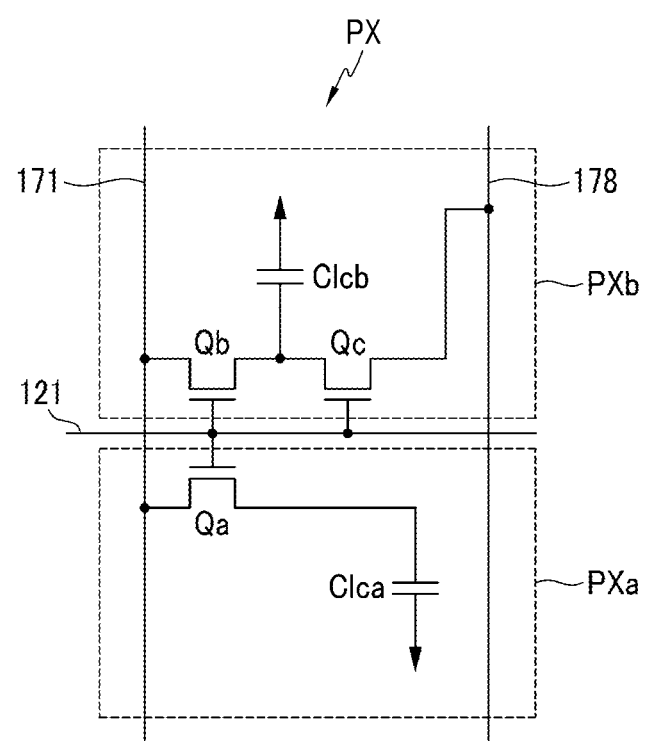
FIG. 26 is an equivalent circuit diagram of one pixel of a liquid crystal display according to an exemplary embodiment of the present invention.

FIG. 26 is an equivalent circuit diagram of one pixel of a liquid crystal display according to another exemplary embodiment of the present invention.

Referring to FIG. 26, a liquid crystal display according to an exemplary embodiment of the present invention includes a signal line including a gate line 121, a data line 171, and a reference voltage line 178 transmitting a reference voltage, and a pixel PX connected thereto.

Each pixel PX includes first and second sub-pixels PXa and PXb. The first sub-pixel PXa includes the first switching element Qa and the first liquid crystal capacitor Clca, and the second sub-pixel PXb includes the second and the third switching elements Qb and Qc and the second liquid crystal capacitor Clcb.

The first and the second thin film transistors Qa and Qb are respectively connected to the gate line 121 and the data line 171, and the third thin film transistor Qc is connected to the output terminal of the second switching element Qb and the reference voltage line 178.

The first switching element Qa includes the output terminal connected to the first liquid crystal capacitor Clca, and the second switching element Qb includes the output terminal connected to the input terminal of the second liquid crystal capacitor Clcb and the third switching element Qc. The third switching element Qc includes the control terminal connected to the gate line 121, the input terminal connected to the second liquid crystal capacitor Clcb, and the output terminal connected to the reference voltage line 178.

Referring to the operation of the pixel PX shown in FIG. 26, if the gate line 121 is applied with the gate-on voltage Von, the first switching element Qa, the second switching element Qb, and the third switching element Qc connected thereto are turned on. Accordingly, the data voltage applied to data line 171 is applied to the first liquid crystal capacitor Clca and the second liquid crystal capacitor Clcb through the turned-on first switching element Qa and second switching element Qb such that the first liquid crystal capacitor Clca and the second liquid crystal capacitor Clcb are charged by the voltage difference between the data voltage Vd and the common voltage Vcom. At this time, the first liquid crystal capacitor Clcb and the second liquid crystal capacitor Clcb are equally applied with the data voltage Vd through the first and the second switching elements Qa and Qb, however the charging voltage of the second liquid crystal capacitor Clcb is divided through the third switching element Qc. Accordingly, the charging voltage of the second liquid crystal capacitor Clcb is smaller than the charging voltage of the first liquid crystal capacitor Clca such that the luminance of the two sub-pixels PXa and Pxb may be different. Accordingly, by properly controlling the voltage charged in the first liquid crystal capacitor Clca and the voltage charged in the second liquid crystal capacitor Clcb, an image viewed from the side may be closest to an image viewed from the front, thereby improving side visibility.

Next, a liquid crystal display according to an exemplary embodiment of the present invention having the circuit structure shown in FIG. 26 will be described with reference to FIG. 27 to FIG. 29. The same constituent elements as in the previous exemplary embodiment are indicated by the same reference numerals, and the same description is omitted.

Figure 27:
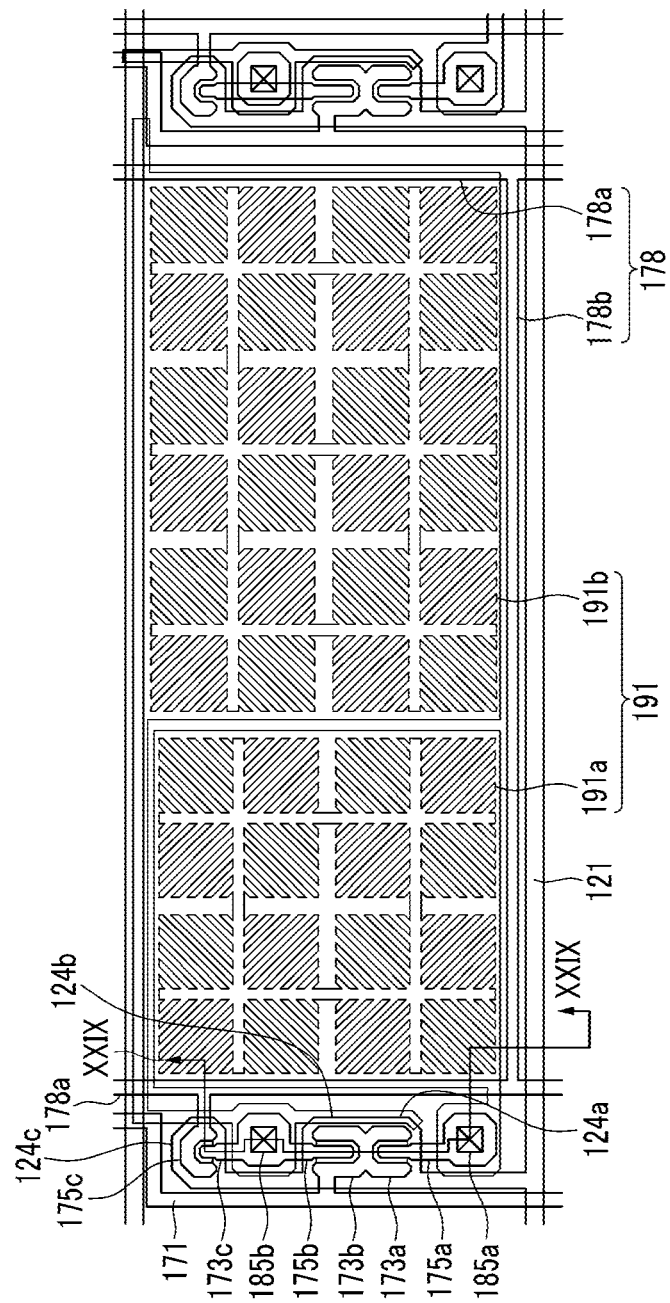
FIG. 27 and FIG. 28 are top plan views of one pixel of a liquid crystal display according to an exemplary embodiment of the present invention.
Figure 28:
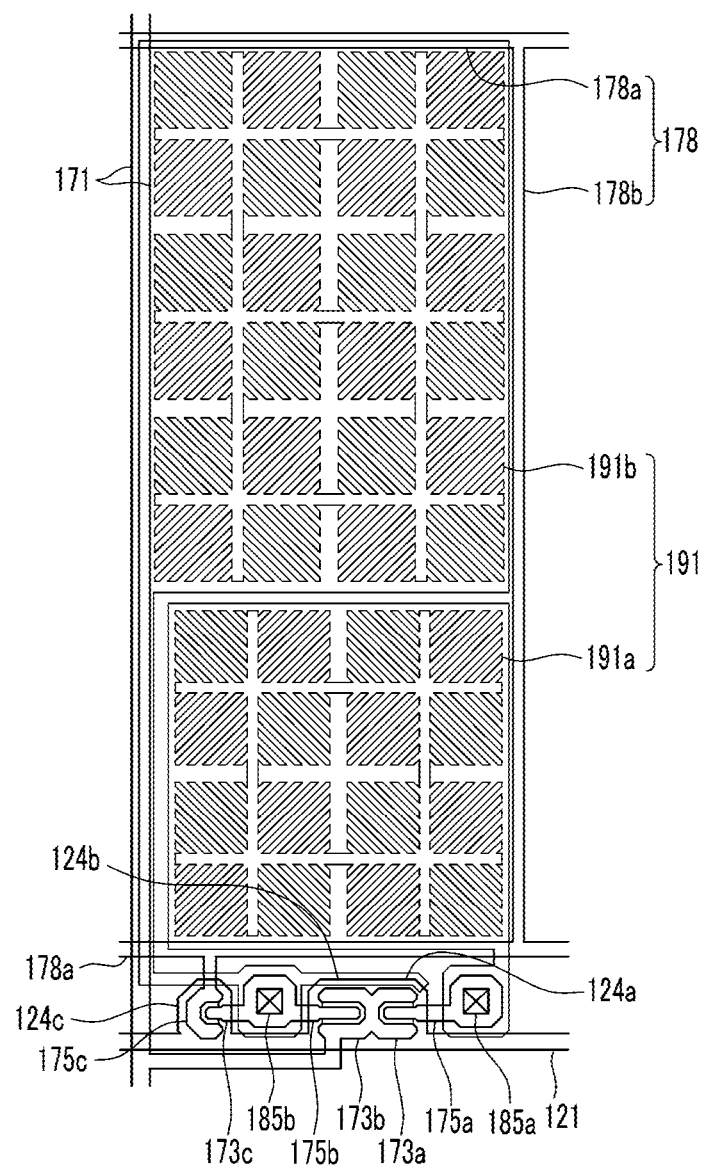
Figure 29:
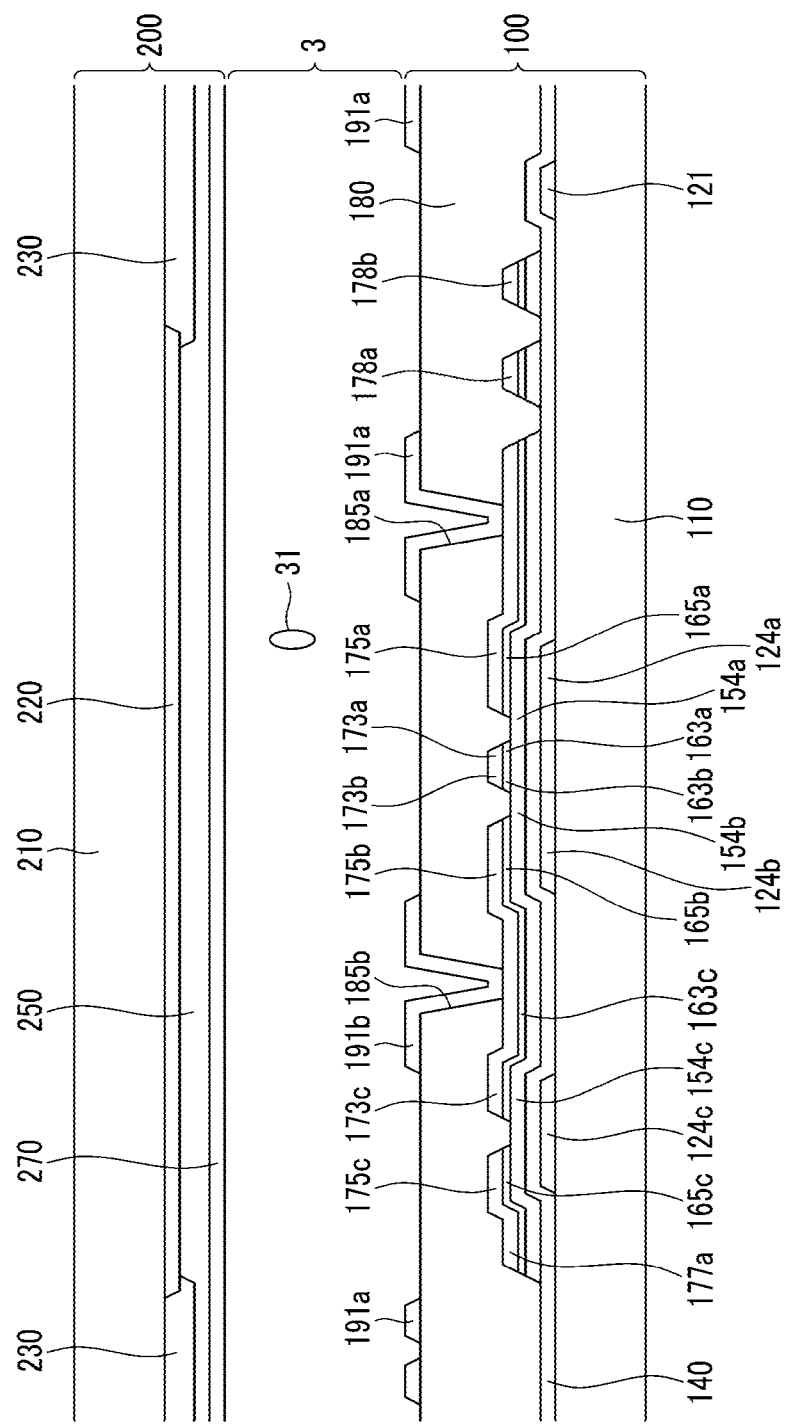
FIG. 29 is a cross-sectional view of the liquid crystal display of FIG. 27 taken along the line XXIX-XXIX.

FIG. 27 and FIG. 28 are top plan views of one pixel of a liquid crystal display according to an exemplary embodiment of the present invention, and FIG. 29 is a cross-sectional view of the liquid crystal display of FIG. 27 taken along the line XXIX-XXIX.

A liquid crystal display according to an exemplary embodiment of the present invention includes the lower panel 100 and the upper panel 200 facing each other, and the liquid crystal layer 3 interposed between two display panels 100 and 200.

FIG. 27 as an example of one pixel PX having a vertical length and a horizontal length longer than the vertical length is an exemplary embodiment in which the first sub-pixel PXa and the second sub-pixel PXb are adjacent in the horizontal direction, and FIG. 28 as an example of one pixel PX having a horizontal length and a vertical length longer than the horizontal length is an exemplary embodiment in which the first sub-pixel PXa and the second sub-pixel PXb are adjacent in the vertical direction.

Referring to FIG. 27 to FIG. 29, referring to the lower panel 100, a gate line 121 including the first gate electrode 124a, the second gate electrode 124b, and the third gate electrode 124c and extending in the transverse direction is positioned on the insulating substrate 110. A gate insulating layer 140 is positioned on the gate line 121, and the first semiconductor 154a, the second semiconductor 154b, and the third semiconductor 154c are positioned thereon. A plurality of ohmic contacts 163a, 165a, 163b, 165b, 163c, and 165c may be positioned on the first semiconductor 154a, the second semiconductor 154b, and the third semiconductor 154c. On the ohmic contacts and the gate insulating layer 140, a data conductor including a data line 171 including the first source electrode 173a and the second source electrode 173b and extending in the longitudinal direction, the first drain electrode 175a, the second drain electrode 175b, the third source electrode 173a, the third drain electrode 175c, and a reference voltage line 178 are positioned. The reference voltage line 178 may include two stems 178a almost parallel to the data line 171, and a connection 178b connecting the two stems 178a. By connecting the two stems 178a of the reference voltage line 178 through the connection 178b, a delay of the signal flowing to the reference voltage line 178 may be prevented. However, the shape of the reference voltage line 178 is not limited thereto, and may be variously changed.

The first gate electrode 124a, the first source electrode 173a, and the first drain electrode 175a form the first thin film transistor Qa along with the first semiconductor 154a, the second gate electrode 124b, the second source electrode 173b, and the second drain electrode 175b form the second thin film transistor Qb along with the second semiconductor 154b, and the third gate electrode 124c, the third source electrode 173c, and the third drain electrode 175c form the third thin film transistor Qc along with the third semiconductor 154c.

A passivation layer 180 is formed on the data conductors and the exposed portion of the semiconductors 154a, 154b, and 154c. The passivation layer 180 has a plurality of contact holes 185a and 185b exposing the first drain electrode 175a and the second drain electrode 175b.

A lower electrode 191 including the first sub-pixel electrode 191a and the second sub-pixel electrode 191b is formed on the passivation layer 180. The first sub-pixel electrode 191a and the second sub-pixel electrode 191b may have the same structure as one of the lower electrodes 191 of the previous several exemplary embodiments, for example as shown in FIG. 1, FIG. 7, FIG. 10, FIG. 13, FIG. 16, or FIG. 19. Particularly, to improve the lateral visibility, when the area of the second sub-pixel electrode 191b is different from the area of the first sub-pixel electrode 191a, the first sub-pixel electrode 191a includes four unit pixel electrodes UP like the lower electrode 191 shown in FIG. 10, and the second sub-pixel electrode 191b may include six or eight unit pixel electrodes UP like the lower electrode 191 shown in FIG. 13 or FIG. 16. FIG. 27 and FIG. 28 shows an example in which the first sub-pixel electrode 191a includes four unit pixel electrodes UP, and the second sub-pixel electrode 191b includes six unit pixel electrodes UP.

The first sub-pixel electrode 191a and the second sub-pixel electrode 191b are physically and electrically connected to the first drain electrode 175a and the second drain electrode 175b through the contact holes 185a and 185b, respectively, thereby receiving the data voltage from the first drain electrode 175a and the second drain electrode 175b. At this time, a portion of the data voltage applied to the second drain electrode 175b is divided through the third source electrode 173c such that the voltage applied to the second sub-pixel electrode 191b may be smaller than the voltage applied to the first sub-pixel electrode 191a.

Meanwhile, the voltage applied to the reference voltage line 178 may be larger than the voltage applied to the common voltage Vcom, and an absolute value of the difference thereof may be in a range of about 1 V to about 4 V.

Next, referring to the upper panel 200, a light blocking member 220 and a color filter 230 are formed on the insulating substrate 210. At least one of the light blocking member 220 and the color filter 230 may be positioned in the lower panel 100. An overcoat 250 is positioned on the color filter 230 and the light blocking member 220, and the overcoat 250 may be omitted.

An upper electrode 270 is positioned on the overcoat 250. The upper electrode 270 positioned in each sub-pixel PXa and PXb may have the same structure as one of the upper electrodes 270 of the previous several exemplary embodiments, for example as shown in FIG. 2, FIG. 8, FIG. 11, FIG. 14, FIG. 17, or FIG. 20. Particularly, to improve the lateral visibility, when the area of the second sub-pixel electrode 191b is different from the area of the first sub-pixel electrode 191a, the upper electrode 270 of the first sub-pixel PXa includes four upper unit electrodes UC like the upper electrode 270 shown in FIG. 11, and the upper electrode 270 of the second sub-pixel PXb may include six or eight upper unit electrodes like the upper electrode 270 shown in FIG. 14 or FIG. 17. In an example as shown in FIG. 27 and FIG. 28, the upper electrode 270 of the first sub-pixel PXa even not shown includes four upper unit electrodes UC, and the upper electrode 270 of the second sub-pixel PXb includes six upper unit electrodes UC.

Figure 30:
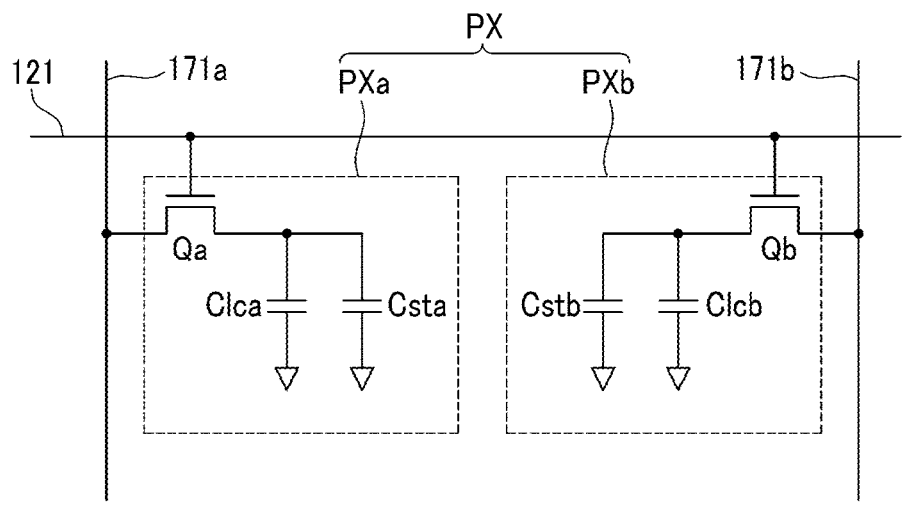
FIG. 30, FIG. 31, and FIG. 32 are equivalent circuit diagrams of one pixel of a liquid crystal display according to an exemplary embodiment of the present invention.
Figure 31:
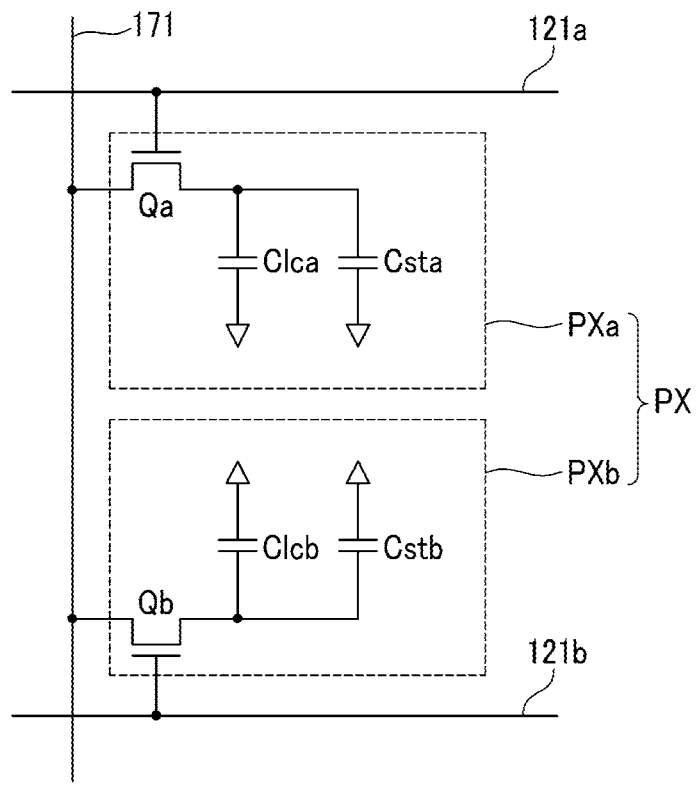
Figure 32:
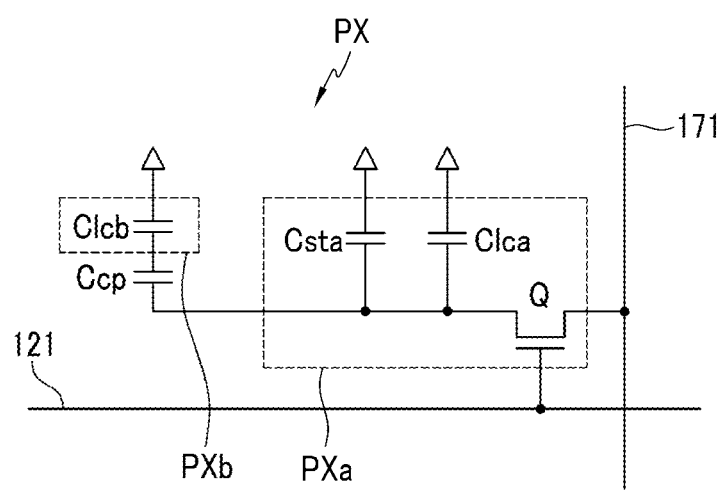

FIG. 30, FIG. 31, and FIG. 32 as equivalent circuit diagrams of one pixel of a liquid crystal display according to an exemplary embodiment of the present invention show the various circuit structures of the pixel PX including the first sub-pixel PXa and the second sub-pixel PXb as well as the above exemplary embodiment.

Referring to FIG. 30, the liquid crystal display according to an exemplary embodiment of the present invention includes the signal lines including the first and the second data lines 171a and 171b and the gate line 121, and the pixel PX connected thereto.

Each pixel PX includes the first and the second sub-pixels PXa and PXb. The first sub-pixel PXa includes the first switching element Qa, the first liquid crystal capacitor Clca, and the first storage capacitor Csta, and the second sub-pixel PXb includes the second switching element Qb, the second liquid crystal capacitor Clcb, and the second storage capacitor Cstb.

The first switching element Qa includes the control terminal connected to the gate line 121 and the input terminal connected to the first data line 171a. The output terminal of the first switching element Qa is connected to the first liquid crystal capacitor Clca and the first storage capacitor Csta.

The second switching element Qb includes the control terminal connected to the gate line 121 and the input terminal connected to the second data line 171b. The output terminal of the second switching element Qb is connected to the second liquid crystal capacitor Clcb and the second storage capacitor Cstb.

The first liquid crystal capacitor Clca and the second liquid crystal capacitor Clcb may be applied with different data voltages Vd for one input image signal IDAT through the first and the second switching elements Qa and Qb connected to the different data lines 171a and 171b.

Next, referring to FIG. 31, the liquid crystal display according to the present exemplary embodiment includes the signal lines including the data line 171 and first and second gate lines 121a and 121b, and the pixel PX connected thereto. Each pixel PX includes the first and the second sub-pixels PXa and PXb.

The first switching element Qa included in the first sub-pixel PXa includes the input terminal connected to the data line 171 and the control terminal connected to the first gate line 121a. The output terminal of the first switching element Qa is connected to the first liquid crystal capacitor Clca and the first storage capacitor Csta.

The second switching element Qb includes the control terminal connected to the second gate line 121b and the input terminal connected to the data line 171. The output terminal of the second switching element Qb is connected to the second liquid crystal capacitor Clcb and the second storage capacitor Cstb.

The first liquid crystal capacitor Clca and the second liquid crystal capacitor Clcb may be applied with the different data voltages Vd for one input image signal IDAT transmitted by the data line 171 through the first and the second switching elements Qa and Qb connected to the different gate lines 121a and 121b at different times.

Next, referring to FIG. 32, the liquid crystal display according to the present exemplary embodiment includes the signal lines including the data line 171 and the gate line 121, and the pixel PX connected thereto. Each pixel PX may include the first and the second sub-pixels PXa and PXb and a coupling capacitor Ccp connected between the two sub-pixels PXa and PXb.

The first sub-pixel PXa has a switching element Q that is connected to a gate line 121 and a corresponding data line 171, and a first liquid crystal capacitor Clca and a storage capacitor Csta that are connected to the switching element Q. The second sub-pixel PXb has a second liquid crystal capacitor Clcb that is connected to the coupling capacitor Ccp.

The switching element Q also has the control terminal connected to the gate line 121, the input terminal connected to a data line 171, and the output terminal connected to the liquid crystal capacitor Clca, the storage capacitor Csta, and the coupling capacitor Ccp. In accordance with the gate signal supplied through the gate line 121, the switching element Q may apply a data voltage supplied through the data line 171 to the first liquid crystal capacitor Clca and the coupling capacitor Ccp, and the coupling capacitor Ccp may change an amplitude of the data voltage and may apply the voltage to the second liquid crystal capacitor Clcb. A charged voltage Vb of the second liquid crystal capacitor Clcb may always be smaller than a charged voltage Va of the first liquid crystal capacitor Clca because of the coupling capacitor Ccp. If the capacitance of the coupling capacitor Ccp is appropriately controlled, a ratio of the charging voltage Va of the first liquid crystal capacitor Clca and the charging voltage Vb of the second liquid crystal capacitor Clcb is controlled, thereby improving the lateral visibility.

In the liquid crystal display according to the several exemplary embodiment, the first sub-pixel electrode and the second sub-pixel electrode forming one terminal of the first liquid crystal capacitor Clca and the second liquid crystal capacitor Clcb included in the pixel PX may have the same shape and function as the lower electrode 191 according to the previous several exemplary embodiments, and the upper electrode 270 of each of the sub-pixels PXa and PXb may also have the same shape and function as the upper electrode 270 according to the previous several exemplary embodiments.

Next, a liquid crystal display according to an exemplary embodiment of the present invention that improves the lateral visibility will be described with reference to FIG. 33 and FIG. 34 as well as FIG. 22 to FIG. 32.

Figure 33:
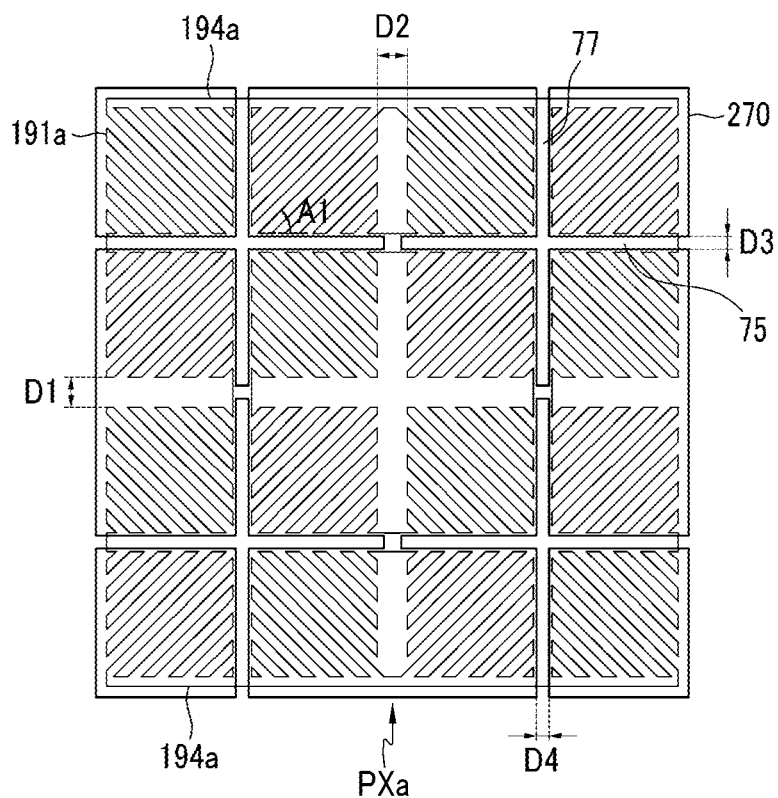
FIG. 33 and FIG. 34 are top plan views of a lower electrode of a liquid crystal display according to an exemplary embodiment of the present invention.
Figure 34:
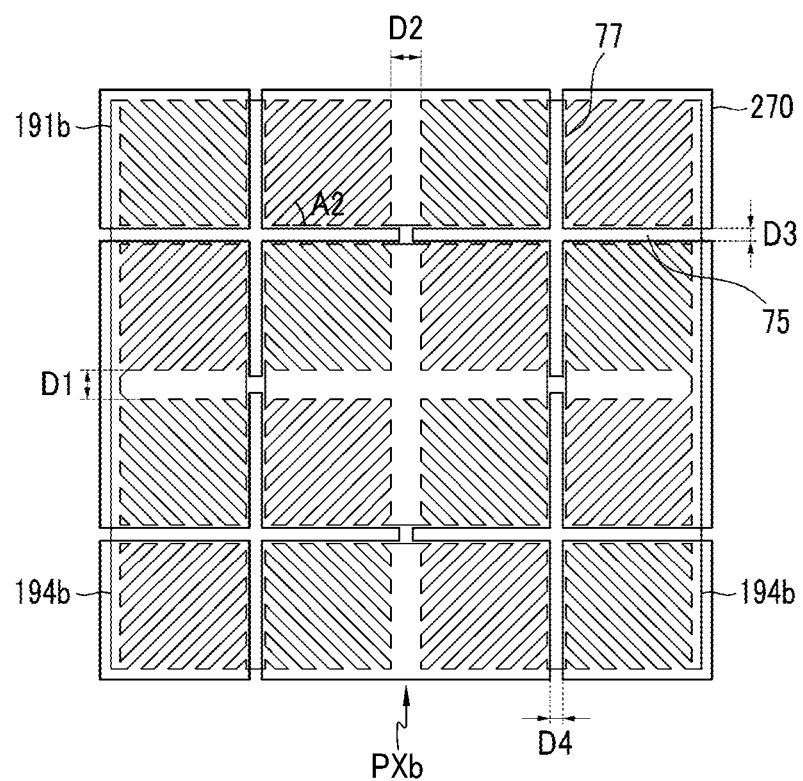

FIG. 33 and FIG. 34 are top plan views of a lower electrode of a liquid crystal display according to an exemplary embodiment of the present invention.

One pixel PX of the liquid crystal display according to an exemplary embodiment of the present invention includes the first sub-pixel PXa and the second sub-pixel PXb according to the previous several exemplary embodiments, and the luminance of the first sub-pixel PXa is higher than or equal to the luminance of the second sub-pixel PXb. The first sub-pixel electrode 191a of the first sub-pixel PXa and the second sub-pixel electrode 191b of the second sub-pixel PXb may have the structure of the lower electrode 191 according to the previous several exemplary embodiments, and the upper electrode 270 may have the structure of the upper electrode 270 according to the previous several exemplary embodiments. FIG. 33 and FIG. 34 show a representative example in which the first sub-pixel electrode 191a and the second sub-pixel electrode 191b include four unit pixel electrodes UP like FIG. 10 and the upper electrode 270 includes four upper unit electrodes UC like FIG. 11.

However, the second sub-pixel electrode 191b may include more unit pixel electrodes UP than the first sub-pixel electrode 191a, and the upper electrode 270 of the second sub-pixel (PXb) may include more upper unit electrodes UC than the upper electrode 270 of the first sub-pixel (PXa).

According to an exemplary embodiment of the present invention, as shown in FIG. 33, in a unit pixel electrode UP of the first sub-pixel electrode 191a, an angle A1 (an acute angle) between the minute branch 199 and the transverse stem 195 may be smaller than about 45 degrees, for example, may be about 40 degrees. Accordingly, when generating the electric field to the liquid crystal layer 3, for the liquid crystal molecules 31 having the angle between the liquid crystal molecules 31 and the transverse stem 195 of less than about 45 degrees, the angle is increased in the first sub-pixel PXa such that the right and left lateral visibility may be improved, particularly in the low gray region.

Also, referring to FIG. 34, in one unit pixel electrode UP of the second sub-pixel electrode 191b, an angle A2 between the minute branch 199 and the transverse stem 195 is larger than the angle A1 in the first sub-pixel PXa and may be about 45 degrees or larger. Accordingly, the right and left lateral visibility may be improved in the high gray region.

According to another exemplary embodiment of the present invention, as shown in FIG. 33, when a width of a transverse gap extending in the transverse direction among a gap between the neighboring unit pixel electrodes UP of the first sub-pixel electrode 191a is referred to as the first distance D1 and a width of a longitudinal gap extending in the longitudinal direction is referred to as the second distance D2, the second distance D2 may be larger than the first distance D1. Simultaneously or selectively, when a width of the transverse opening 75 of the upper electrode 270 of the first sub-pixel PXa is referred to as the third distance D3 and a width of the longitudinal opening 77 is referred to as the fourth distance D4, the fourth distance D4 may be larger than the third distance D3. Accordingly, when generating the electric field to the liquid crystal layer 3, for the liquid crystal molecules 31 having the angle between the liquid crystal molecules 31 and the transverse stem 195 of less than about 45 degrees, the angle is increased in the first sub-pixel PXa such that the right and left lateral visibility may be improved, particularly in the low gray region.

Also, referring to FIG. 34, among the gap between the neighboring unit pixel electrodes UP of the second sub-pixel electrode 191b, the first distance D1 as the width of the transverse gap may be larger than the second distance D2 as the width of the longitudinal gap. Simultaneously or selectively, the third distance D3 as the width of the transverse opening 75 of the upper electrode 270 of the second sub-pixel PXb may be larger than the fourth distance D4 as the width of the longitudinal opening 77. Accordingly, the right and left lateral visibility may be improved in the high gray region.

According to another exemplary embodiment of the present invention, to improve the lateral visibility, as shown in FIG. 33, among the ends of the minute branches 199 of the first sub-pixel electrode 191a, the ends of the minute branches 199 positioned at the upper end and the lower end may be connected to each other through a connection 194a. Also, referring to FIG. 34, among the ends of the minute branches 199 of the second sub-pixel electrode 191b, the ends of the minute branches 199 positioned at the left end and the right end may be connected to each other through a connection 194b.

Next, referring to FIG. 35 to FIG. 38, a liquid crystal display according to an exemplary embodiment of the present invention will be described. The same constituent elements as the previous exemplary embodiments are indicated by the same reference numerals, and the same description is omitted.

FIG. 35 to FIG. 38 are top plan views of a lower electrode and an upper electrode of a liquid crystal display according to an exemplary embodiment of the present invention.

In the liquid crystal display according to the present exemplary embodiment, like the exemplary embodiments shown in FIG. 10 to FIG. 18, the lower electrode 191 for one pixel PX includes a plurality of the unit pixel electrodes UP according to the previous several exemplary embodiments, and the upper electrode 270 for one pixel PX includes a plurality of the upper unit electrodes UC according to the previous several exemplary embodiments. The number of unit pixel electrodes UP or upper unit electrodes UC included in one pixel PX may be different by considering the liquid crystal control force according to the area of the pixel PX. Here, four unit pixel electrodes UP are connected to each other and four upper unit electrodes UC are connected to each other, but they are not limited thereto.

A plurality of unit pixel electrodes UP are connected to each other through the connection 192. The connection 192 may be positioned on an extending line of the cross-shaped stem 195 and 197 of the unit pixel electrode UP. Also, a space between the unit pixel electrodes UP neighboring in a column direction, that is, the vertical direction, forms a transverse gap 95, and a space between the unit pixel electrodes UP neighboring in a row direction, that is, the horizontal direction, forms a longitudinal gap 97.

A plurality of upper unit electrodes UC are connected to each other. The cross-shaped openings 75 and 77 of the upper unit electrodes UC neighboring in the row direction or the column direction and facing each other may be connected to each other. In this case, to prevent the upper unit electrodes UC of one upper electrode 270 from being separated into a plurality of pieces, the ends of the cross-shaped openings 75 and 77 adjacent to the edge of the upper electrode 270 are separated from the edge of the upper electrode 270 thereby forming a connection 274. That is, in each upper unit electrode UC, four sub-regions divided by the cross-shaped openings 75 and 77 may be connected through the connection 274.

The liquid crystal molecules 31 positioned at the transverse gap 95 as the space between the neighboring unit pixel electrodes UP or the region of the longitudinal gap 97 has a non-uniform inclination direction, and may be inclined in both directions approximately parallel to the extending direction of the transverse gap 95 or the longitudinal gap 97. Accordingly, in this portion, the liquid crystal molecules 31 are controlled in different directions from the sub-region where the minute branches 199 of the lower electrode 191 are formed. Particularly, if a pressure is applied from the outside to the display panel of the liquid crystal display displaying the image, the arrangement direction of the liquid crystal molecules 31 near the transverse gap 95 or the longitudinal gap 97 is scattered and they collide with each other such that the texture is generated, and this texture is recognized as bruising since the direction of the liquid crystal molecules 31 near the transverse gap 95 or the longitudinal gap 97 is not recovered after the external pressure is removed. That is, the arrangement of the liquid crystal molecules 31 near the transverse gap 95 or the longitudinal gap 97 affects the surrounding liquid crystal molecules 31 by the external pressure such that the scattering of the arrangement of the liquid crystal molecules 31 is transmitted into the surrounding transverse gap 95 or longitudinal gap 97 and the texture is spread, and resultantly this texture is recognized as the bruising after the external pressure is removed. This bruising may be further serious when the displayed image is the high gray.

Methods of suppressing the bruising generation due to the remaining texture after the removal of the pressure and quickly eliminating the bruising will be described with reference to FIG. 35 to FIG. 38.

Figure 35:
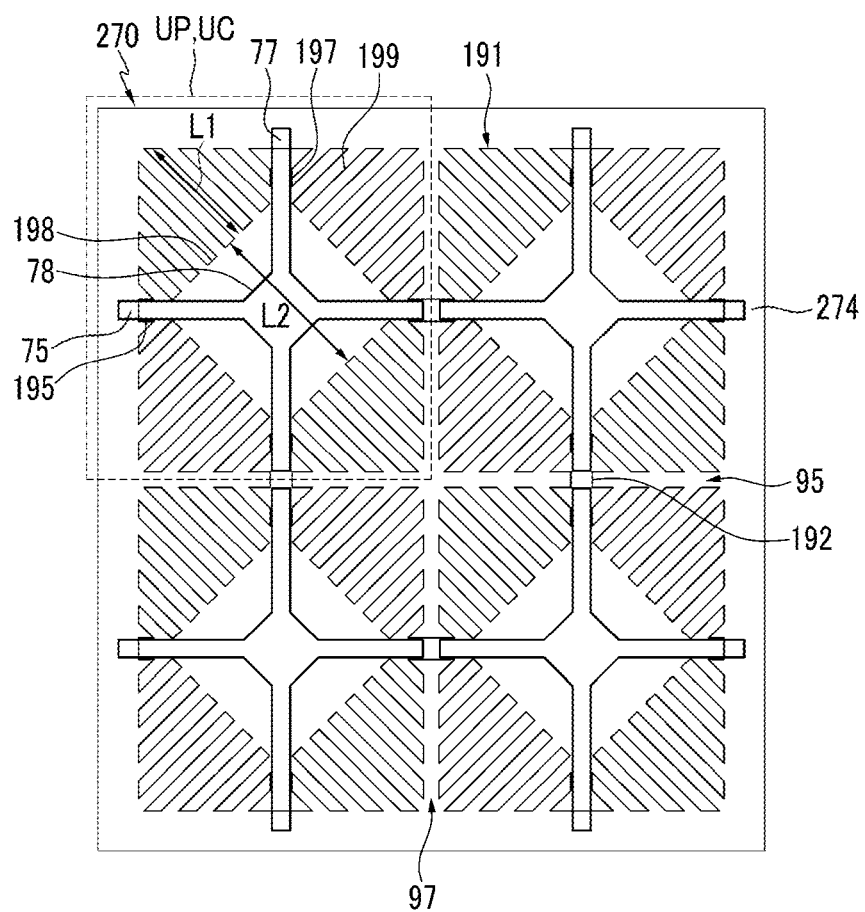
FIG. 35, FIG. 36, FIG. 37 and FIG. 38 are top plan views of a lower electrode and an upper electrode of a liquid crystal display according to an exemplary embodiment of the present invention.

Referring to FIG. 35, the lower electrode 191 for one pixel PX according to the present exemplary embodiment is the same as most of the exemplary embodiments shown in FIG. 10 to FIG. 18, however as shown in FIG. 7, the center pattern 198 positioned at the center portion of the cross-shaped stems 195 and 197 of each unit pixel electrode UP is included. The description related to the exemplary embodiment shown in FIG. 7 may be equally applied here. For example, when the center pattern 198 is a rhombus, each edge of the rhombus may form an oblique angle for the extending direction of the cross-shaped stem 195 and 197. In detail, the edge of the center pattern 198 and the extending direction of the minute branch 199 may be substantially perpendicular to each other.

As described, if the center pattern 198 is formed at the center portion of the cross-shaped stems 195 and 197 of each unit pixel electrode UP, the fringe field caused by the edge of the center pattern 198 has an influence near the transverse gap 95 or the longitudinal gap 97 such that the liquid crystal control force may be increased. Accordingly, after the external pressure is removed, the spots due to the texture may be easily removed and the generation thereof may be suppressed. As the length L2 of one side of the center pattern 198 or the distance L2 between the two facing edges is increased, the spot generation due to the external pressure may be further reduced.

Also, if the length L1 of the minute branch 199 of the unit pixel electrode UP is short, the liquid crystal control force may be increased by the fringe field formed by the end portion of the minute branch 199, and the liquid crystal control force near the transverse gap 95 or the longitudinal gap 97 may be increased. In the limited unit pixel electrode UP, as the size of the center pattern 198 is increased, the length L1 of the minute branch 199 is shortened such that the effect of the formation of the center pattern 198 and the effect of the shortened length of the minute branch 199 overlap each other, thereby further reducing the spot generation by the external pressure.

The upper electrode 270 for one pixel PX according to the present exemplary embodiment is also the same as most of the exemplary embodiments shown in FIG. 10 to FIG. 18, however as shown in FIG. 8, the center opening 78 positioned at the center portion of the cross-shaped openings 75 and 77 of each upper unit electrode UC may be included. The description related to the exemplary embodiment shown in FIG. 8 may be equally applied here. For example, when the center opening 78 is a rhombus, each edge may form an oblique angle for the extending direction of the cross-shaped stems 195 and 197. In detail, the edge of the center opening 78 and the extending direction of the minute branch 199 may be substantially perpendicular to each other.

As described above, if the upper electrode 270 includes the center opening 78, the fringe field caused by the edge of the center opening 78 has an influence near the transverse gap 95 or the longitudinal gap 97 such that the liquid crystal control force may be increased. Accordingly, after the external pressure is removed, the spots due to the texture may be easily removed and the generation thereof may be suppressed.

Figure 36:
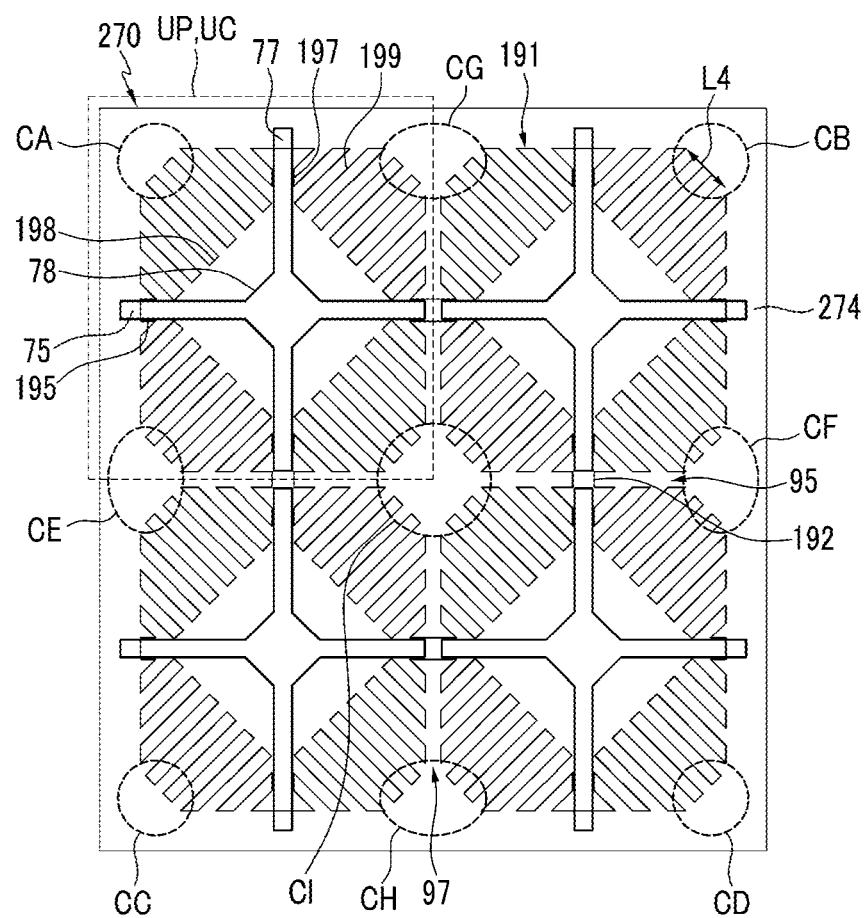

Next, referring to FIG. 36, the present exemplary embodiment is the same as most of the exemplary embodiment shown in FIG. 35, however the structure of the lower electrode 191 may be different. In the present exemplary embodiment, at least one portion among four corners CA, CB, CC, CD, CE, CF, CG, CH, and CI of each unit pixel electrode UP may be chamfered. FIG. 36 shows an example in which all corners CA, CB, CC, CD, CE, CF, CG, CH, CI of each unit pixel electrode UP are chamfered. However, the center portion of the lower electrode 191 where four unit pixel electrodes UP are gathered may not be chamfered.

The length L4 of the chamfered corner may be from about 1/7 to about 3/14 of the length of the one edge of the unit pixel electrode UP. For example, the length L4 of the chamfered corner may be about 10 μm to 15 μm, when the length of one edge of the unit pixel electrode UP is about 70 μm.

As described, if the corner of the unit pixel electrode UP is chamfered, the end of the minute branch 199 is cut such that the length of the relatively long minute branch 199 may be reduced. Accordingly, as described above, the influence of the fringe field by the end of the minute branch 199 is well transmitted near the transverse gap 95 or longitudinal gap 97 such that the liquid crystal control force may be increased. Also, in the chamfered corner, the end of the minute branch 199 forms the oblique angle along with the transverse stem 195 or the longitudinal stem 197 such that the liquid crystal control force in the direction almost parallel to the extending direction of the minute branch 199 may be increased. Accordingly, the bruising by the external pressure may be well prevented or may be quickly removed.

The exemplary embodiment shown in FIG. 36 includes the characteristics of the exemplary embodiment shown in FIG. 35, however the center pattern 198 or the center opening 78 may not be included. However, by including the characteristics of the several exemplary embodiments, the effect according to an exemplary embodiment of the present invention may be maximized.

Figure 37:
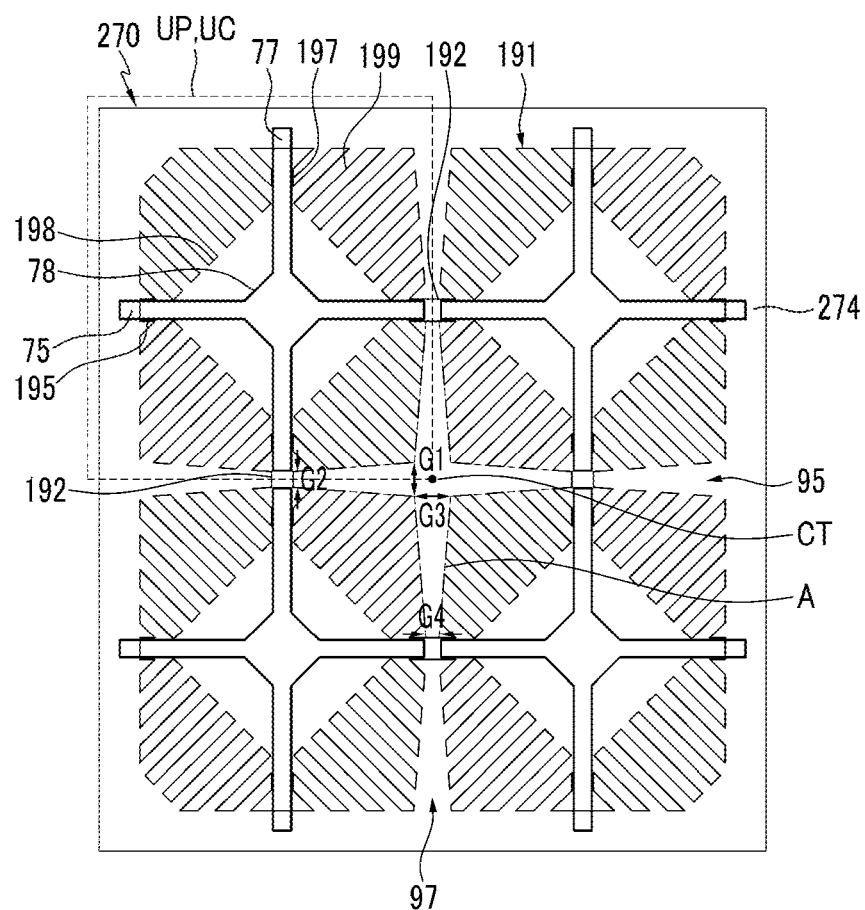

Next, referring to FIG. 37, the present exemplary embodiment is the same as most of the exemplary embodiment shown in FIG. 35 or FIG. 36, however, the structure of the lower electrode 191 may be different. Particularly, the shape of the transverse gap 95 or the longitudinal gap 97 of the lower electrode 191 may be different. According to the present exemplary embodiment, the edge A of the transverse gap 95 or the longitudinal gap 97 is not parallel to the horizontal direction or the vertical direction, but is inclined thereby forming the oblique angle. That is, the width of the transverse gap 95 or the longitudinal gap 97 is not uniform and may be changed according to the position.

In detail, the width of the transverse gap 95 or the longitudinal gap 97 at the intersection point between an imaginary line connecting transverse opening or longitudinal opening and longitudinal gap 97 or transvers gap 95 is smallest. The width of the transverse gap 95 or the longitudinal gap 97 may be increase according to increasing distance from the intersection point. Accordingly, the width of the transverse gap 95 or the longitudinal gap 97 may be maximized at the center portion CT of the lower electrode 191, that is, the center portion CT where four unit pixel electrodes UP are gathered, or at the corner of the unit pixel electrodes UP. Also, the width of the transverse gap 95 or the longitudinal gap 97 may be maximized near the edge of the lower electrode 191.

The maximum width G1 of the transverse gap 95 may be about 5.5 µm to about 8 µm and the minimum width G2 of the transverse gap 95 may be about 3 µm to about 4 µm, but they are not limited thereto. The maximum width G3 of the longitudinal gap 97 may be about 7 µm to about 10 µm and the minimum width G4 of the longitudinal gap 97 may be about 4 µm to about 5 µm, but they are not limited thereto.

As described, if the edge A of the transverse gap 95 or the longitudinal gap 97 of the lower electrode 191 is inclined, the liquid crystal molecules 31 positioned at the region of the transverse gap 95 or the longitudinal gap 97 may be inclined in the direction that is not parallel to the horizontal direction or the vertical direction. Accordingly, the liquid crystal molecules 31 near the transverse gap 95 or the longitudinal gap 97 are controlled and inclined in the direction close to the extending direction of the neighboring minute branches 199 such that the texture in this portion may be reduced. Therefore, the generation of the remaining bruising may be suppressed and the bruising is quickly eliminated after the pressure is removed after the application of the external pressure.

The exemplary embodiment shown in FIG. 37 includes the characteristics of the exemplary embodiment shown in FIG. 35 and FIG. 36, however the characteristics of at least one exemplary embodiment among FIG. 35 and FIG. 36 may not be included. However, by including the characteristics of the several exemplary embodiments together, the effect according to an exemplary embodiment of the present invention may be maximized.

Figure 38:
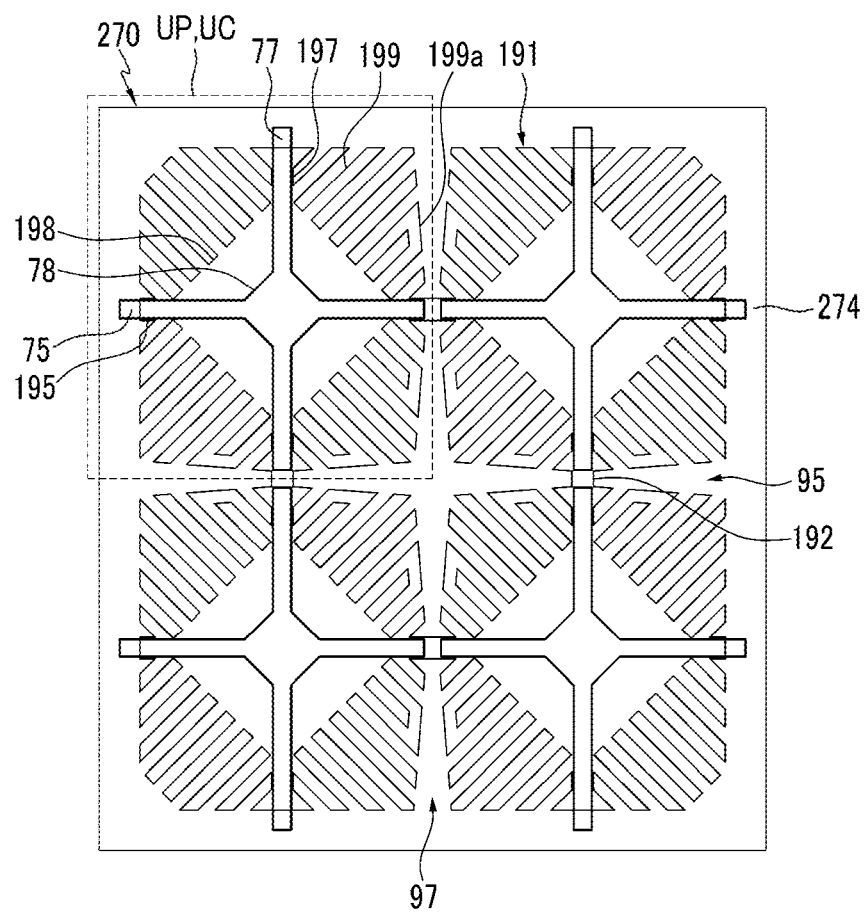

Next, referring to FIG. 38, the present exemplary embodiment is the same as most of the exemplary embodiment shown in FIG. 35, FIG. 36, or FIG. 37, however the structure of the lower electrode 191 may be different. Particularly, the portions of the ends of the neighboring minute branches 199 of the lower electrode 191 may be connected to each other. FIG. 38 is an example in which two neighboring ends among the ends of the minute branches 199 near the transverse gap 95 or the longitudinal gap 97 are connected to each other by the connection 199a, but it is not limited thereto.

Particularly, as described above, when the edge A of the transverse gap 95 or the longitudinal gap 97 is inclined, the connection 199a connecting the ends of the minute branches 199 near the transverse gap 95 or the longitudinal gap 97 generates the fringe field in the direction forming the oblique angle for the horizontal direction or the vertical direction. Accordingly, the liquid crystal molecules 31 positioned near the transverse gap 95 or the longitudinal gap 97 may be inclined while having the directivity by the connection 199a such that the remaining bruising may be reduced after the external pressure is removed.

The exemplary embodiment shown in FIG. 38 includes the characteristics of the exemplary embodiment shown in FIG. 35 to FIG. 37, however the characteristics of at least one exemplary embodiment among FIG. 35 to FIG. 37 may not be included. However, by including the characteristics of the several exemplary embodiments together, the effect according to an exemplary embodiment of the present invention may be maximized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first electrode including at least one first unit electrode;
    a second electrode facing the first electrode and including at least one second unit electrode; and
    a liquid crystal layer disposed between the first electrode and the second electrode and including a plurality of liquid crystal molecules,
    wherein
    a first unit electrode of the at least one first unit electrode includes:
    a center planar portion positioned at a center of the first unit electrode and including a plurality of edges; and
    a plurality of branches extending from the plurality of edges of the center planar portion,
    the second electrode includes an opening overlapping the center planar portion in a plan view, the opening including a center opening having edges substantially parallel to the plurality of edges of the center planar portion, respectively, and a portion extending from the center opening and extending substantially in a first direction,
    each of the plurality of edges of the center planar portion is substantially straight and extends obliquely to the first direction, and
    the portion of the opening extends obliquely to an extending direction of the plurality of edges of the center planar portion.

2. The liquid crystal display of claim 1, wherein the center opening overlaps the center of the first unit electrode.

3. The liquid crystal display of claim 1, wherein the plurality of branches extend substantially perpendicular to the edges of the center planar portion.

4. The liquid crystal display of claim 3, wherein the plurality of branches extend obliquely to the first direction.

5. The liquid crystal display of claim 1, wherein
    the opening further includes a portion extending from the center opening and extending substantially in a second direction perpendicular to the first direction.

6. The liquid crystal display of claim 5, wherein the center opening has a plurality of straight edges extending obliquely to the first direction.

7. The liquid crystal display of claim 5, wherein the center opening is smaller than the center planar portion.

8. The liquid crystal display of claim 1, wherein
    the first electrode includes a plurality of first unit electrodes connected to each other,
    the second electrode includes a plurality of second unit electrodes connected to each other.

9. The liquid crystal display of claim 1, wherein
    the liquid crystal display includes a plurality of pixels,
    a pixel of the plurality of pixels includes a first sub-pixel and a second sub-pixel that are configured to display images having different luminances from each other for one input image signal, each of the first sub-pixel and the second sub-pixel includes the first electrode and the second electrode, and a number of the at least one first unit electrode included in the second sub-pixel is larger than a number of the at least one first unit pixel electrode included in the first sub-pixel.

10. The liquid crystal display of claim 1, wherein opposing edges of the plurality of edges of the center planar portion and the center opening are substantially parallel to each other.

* * * * *